United States Patent
Rosado-Toro et al.

(10) Patent No.: US 10,204,413 B2
(45) Date of Patent: Feb. 12, 2019

(54) SYSTEM AND METHOD THAT EXPANDS THE USE OF POLAR DYNAMIC PROGRAMMING TO SEGMENT COMPLEX SHAPES

(71) Applicant: Arizona Board of Regents on Behalf of the University of Arizona, Tucson, AZ (US)

(72) Inventors: Jose Rosado-Toro, Tucson, AZ (US); Jeffrey J. Rodriguez, La Jolla, CA (US); Ryan Avery, Tucson, AZ (US); Aiden Abidov, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 15/639,535

(22) Filed: Jun. 30, 2017

(65) Prior Publication Data
US 2018/0005373 A1 Jan. 4, 2018

Related U.S. Application Data

(60) Provisional application No. 62/356,808, filed on Jun. 30, 2016.

(51) Int. Cl.
| | |
|---|---|
| *G06K 9/00* | (2006.01) |
| *G06T 7/00* | (2017.01) |
| *G06T 7/11* | (2017.01) |
| *G06T 7/12* | (2017.01) |
| *G06T 7/143* | (2017.01) |
| *G06T 7/174* | (2017.01) |
| *G06T 7/557* | (2017.01) |

(52) U.S. Cl.
CPC .............. *G06T 7/0012* (2013.01); *G06T 7/11* (2017.01); *G06T 7/12* (2017.01); *G06T 7/143* (2017.01); *G06T 7/174* (2017.01); *G06T 7/557* (2017.01); *G06T 2207/10016* (2013.01); *G06T 2207/10088* (2013.01); *G06T 2207/20101* (2013.01); *G06T 2207/30048* (2013.01)

(58) Field of Classification Search
CPC . G06T 2207/10088; G06T 2207/20101; G06T 2207/30048; G06T 7/0012; G06T 7/11; G06T 7/12
See application file for complete search history.

(56) References Cited

U.S. PATENT DOCUMENTS

| | | | | |
|---|---|---|---|---|
| 2008/0152220 | A1* | 6/2008 | Shi ...................... | G06K 9/3233 382/164 |
| 2008/0292169 | A1* | 11/2008 | Wang .................... | G06T 7/0012 382/131 |
| 2009/0060332 | A1* | 3/2009 | Knapp .................... | G06K 9/34 382/173 |

(Continued)

OTHER PUBLICATIONS

Sun, Changming, and Stefano Pallottino. "Circular shortest path in images." Pattern Recognition 36.3 (2003): 709-719. (Year: 2003).*

(Continued)

*Primary Examiner* — Li Liu
(74) *Attorney, Agent, or Firm* — Keith A. Vogt; Vogt IP

(57) ABSTRACT

The present invention provides a system and method that uses polar dynamic programming PDP (PDP) method to generate a segmented image of a shape.

18 Claims, 22 Drawing Sheets

(56) References Cited

U.S. PATENT DOCUMENTS

| | | | |
|---|---|---|---|
| 2009/0080747 A1* | 3/2009 | Lu .................... | G06T 7/0012 382/131 |
| 2010/0098313 A1* | 4/2010 | Knapp ................ | G06T 7/12 382/132 |
| 2011/0286643 A1* | 11/2011 | Kislal ................ | G06T 7/0012 382/128 |
| 2012/0075638 A1* | 3/2012 | Rollins .............. | A61B 1/00009 356/479 |
| 2015/0371400 A1* | 12/2015 | Farsiu ................ | G06T 7/0012 382/128 |
| 2017/0109893 A1* | 4/2017 | Cong .................. | G06T 7/12 |
| 2017/0140530 A1* | 5/2017 | Jiang ................. | G06T 7/0016 |
| 2017/0178285 A1* | 6/2017 | Jiang ................. | G06T 7/12 |

OTHER PUBLICATIONS

Zhang, Yan, Bogdan J. Matuszewski, and Lik-Kwan Shark. "A novel medical image segmentation method using dynamic programming." Medical Information Visualisation—BioMedical Visualisation, 2007. MediVis 2007. International Conference on. IEEE, 2007. (Year: 2007).*

Hu, Huaifei, et al. "Hybrid segmentation of left ventricle in cardiac MRI using gaussian-mixture model and region restricted dynamic programming." Magnetic resonance imaging 31.4 (2013): 575-584. (Year: 2013).*

Timp, Sheila, and Nico Karssemeijer. "A new 2D segmentation method based on dynamic programming applied to computer aided detection in mammography." Medical physics 31.5 (2004): 958-971. (Year: 2004).*

M. Kass, A. Witkin and D. Terzopoulos, "Snakes: Active contour models," Int. J. Comput. Vis., vol. 1, No. 4, pp. 321-331, Jan. 1987.

C. Xu and J. L. Prince, "Snakes, shapes, and gradient vector flow," IEEE Trans. Image Process., vol. 7, No. 3, pp. 359-369, Mar. 1998.

C. Xu and J. L. Prince, "Generalized gradient vector flow external forces for active contours," Signal Process., vol. 71, No. 2, pp. 131-139, Dec. 1998.

N. Ray and S. T. Acton, "Motion gradient vector flow: An external force for tracking rolling leukocytes with shape and size constrained active contours," IEEE Trans. Med. Imag., vol. 23, No. 12, pp. 1466-1478, Dec. 2004.

L. Bing and S. T. Acton, "Active contour external force using vector field convolution for image segmentation," IEEE Trans. Image Process., vol. 16, No. 8, pp. 2096-2106, Aug. 2007.

L. Bing and S. T. Acton, "Automatic active model initialization via Poisson inverse gradient," IEEE Trans. Image Process., vol. 17, No. 8, pp. 1406-1420, Aug. 2008.

D. Mumford and J. Shah, "Optimal approximation by piecewise smooth functions and associated variational problems," Commun. Pure Appl. Math., vol. 42, No. 5, pp. 577-685, Oct. 1989.

T. Chan and L. Vese, "Active contour without edges," IEEE Trans. Image Process., vol. 10, No. 2, pp. 266-277, Feb. 2001.

C. Li, C. Kao, J. C. Gore and Z. Ding, "Minimization of region-scalable fitting energy for image segmentation," IEEE Trans. Image Process., vol. 17, No. 10, pp. 1940-1949, Oct. 2008.

S. Lankton and A. Tannenbaum, "Localizing region-based active contours," IEEE Trans. Image Process., vol. 17, No. 11, pp. 2029-2039, Nov. 2008.

S. Mukherjee and S.T. Acton, "Region based segmentation in presence of intensity inhomogeneity using Legendre polynomials," IEEE Signal Process. Lett., vol. 22, No. 3, pp. 298-302, Mar. 2015.

S. Osher and J. Sethian, "Fronts propagating with curvature-dependent speed: algorithms based on Hamilton-Jacobi formulations," J. Comput. Phys., vol. 79, No. 1, pp. 12-49, Nov. 1988.

V. Caselles, F. Catte, T. Coll and F. Dibos, "A geometric model for active contours in image processing," Numer. Math., vol. 66, No. 1, pp. 1-31, Dec. 1993.

R. Malladi, J. A. Sethian and B. C. Venturi, "Shape modeling with front propagation: A level set approach," IEEE Trans. Pattern. Anal. Mach. Intell., vol. 17, No. 2, pp. 158-175, Feb. 1995.

Tarroni et al; "Near-Automated 3D Segmentation of Left and Right Ventricles on Magnetic Resonance Images"; 6 pages; 8th International Symposium on Image and Signal Processing an Analysis; Sep. 4-6, 2013; Trieste, Italy.

S. Osher and R. Fedkiw, Level Set Methods and Dynamic Implicit Surfaces. New York: Springer-Verlag, 2002.

C. Li, C. Xu, C. Gui and M. D. Fox, "Level-set evolution without re-initialization: a new variational formula,". IEEE Conf. Comput. Vis. Pattern Recognit. (CVPR), vol. 1, pp. 430-436, Jun. 2005.

C. Li, C. Xu, C. Gui and M. D. Fox, "Distance regularized level set evolution and its application to image segmentation," IEEE Trans. Image Process., vol. 19, No. 12, pp. 3243-3254, Dec. 2010.

M. Sonka, V. Hlavac and R. Boyle, Image Processing, Analysis and Machine Vision, Fourth Edition. Stanford CT: Global Engineering, 2015; Sect 6.2.5, pp. 206-210.

J. A. Rosado-Toro, T. Barr, J. P. Galons, M. T. Marron, A. Stopeck, C. Thomson, P. Thompson, D. Carroll, E. Wolf, M. I. Altbach, J. J. Rodriguez, "Automated breast segmentation of fat and water Mr images using dynamic programming," Acad. Radiol., vol. 22, No. 2, pp. 139-148, Feb. 2015.

S. Avidan and A. Shamir, "Seam carving for content-aware image resizing," ACM Trans. Graph., vol. 26, No. 3, article 10, Jul. 2007.

A. P.Moore, S. J. D. Prince, J. Warrell, U. Mohammed and G. Jones, "Superpixel lattices," Proc. IEEE Conf. Comput. Vis. Pattern Recognit, vol. 1, pp. 1-8, Jun. 2008.

S. Timp and N. Karssemeijer, "A new 2D segmentation method based on dynamic programming applied to computer aided detection in mammography," Med. Phys., vol. 31, No. 5, pp. 958-971, May 2004.

Y. Zhang, B. J. Matuszewski, L. K Shark and C. J. Moore, "A novel medical image segmentation method using dynamic programming," Int. Conf. Med. Inform. Visualization—BioMed. Visualization (MediVis '07), pp. 69-74, Jul. 2007.

D. C. Chang and W. R. Wu, "Image contrast enhancement based on a histogram transformation of local standard deviation," IEEE Trans. Med. Image, vol. 17, No. 4, pp. 518-531, Aug. 1998.

P. K. Bøcher and K. R. McCloy, "The fundamentals of average local variance—part I: detecting regular patterns," IEEE Trans. Image Process., vol. 15, No. 2, pp. 300-310, Feb. 2006.

Handbook of Computer Vision Algorithms in Image Algebra, 2nd edition, CRC Press Inc., Boca Raton, FL, 2000, pp. 313.

L. R. Dice, "Measures of the amount of ecologic association between species," Ecology, vol. 26, No. 3, pp. 297-302, Jul. 1945.

V. Chalana and Y. Kim, "A methodology for evaluation of boundary detection algorithms on medical images," IEEE Trans. Med. Imag., vol. 16, No. 5, pp. 642-652, Oct. 1997.

R. D. Fiete and T. Tantalo, "Comparison of snr image quality metrics for remote sensing systems," Opt. Eng., vol. 40, No. 4, pp. 574-585, Apr. 2001.

* cited by examiner

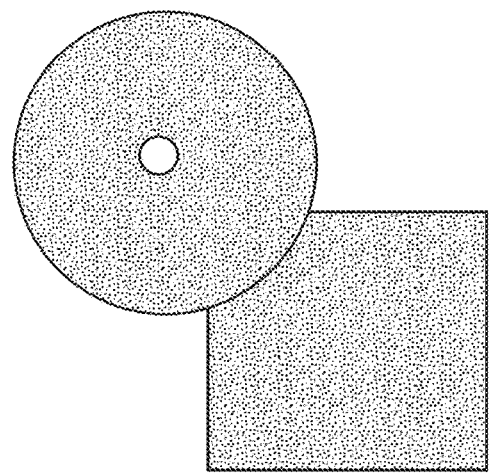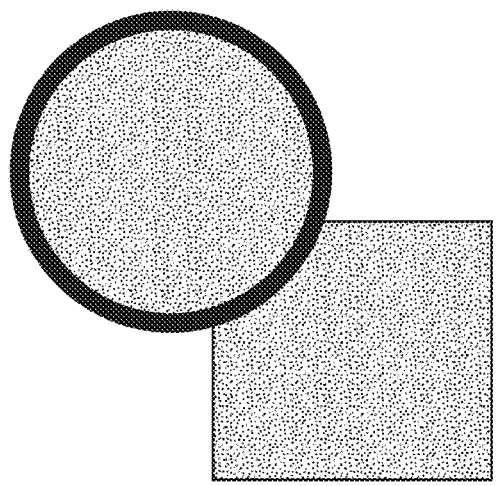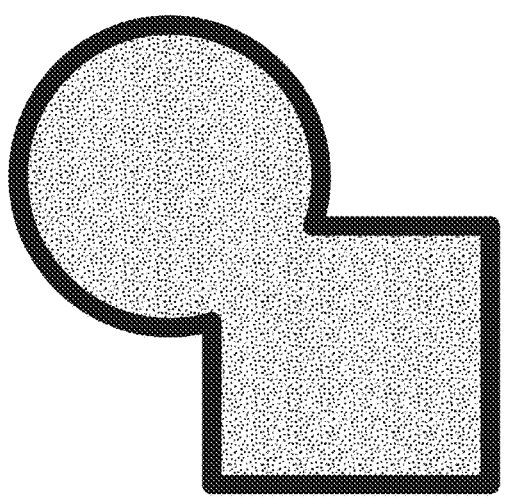
FIG. 3A  FIG. 3B procedure GROW($\Omega,I,G,\gamma,\alpha,\beta,\Delta\rho,\Delta\theta$)

Input $\Omega$ is the initial segmentation calculated using the user selected origin xo,yo. $\Omega$ is the union of $\Omega1$ and $\Omega2$, where $\Omega1$ is the region inside the closed contour and $\Omega2$ is the extracted contour. I is the intensity image and G is the gradient image. $\gamma$ is the smoothing parameter for the variance image (default value 5°). $\alpha$ and $\beta$ are the weight values for the cost function (default values 0.5). $\Delta\rho$ is the radial sampling interval (default value 0.5) and $\Delta\theta$ is the angular sampling interval (default value is a multiple of $\Delta\theta min$).

Output $\Omega$ is the grown region.

1. threshold = mean of G in $\Omega1$
2. weakEdges = (G<=threshold) $\Omega2$
3. Initialize closedEdgesas a zero matrix the size of G
4. while sum(weakEdges(:)) > 0 do
5. [xn,yn] = Point of the largest connected component of
6. weakEdgesthat is the farthest away from a strong edge.
7. $\Omega$temp = SPDP(I,G,xn,yn, $\gamma,\alpha,\beta,\Delta\rho,\Delta\theta$) \\Sections II-A to II-D
8. $\Omega$new = $\Omega$temp $\Omega$C \\$\Omega$C is complement of $\Omega$
9. $\Omega$new is the connected component from $\Omega$new that is closest to [xn,yn].
10. weakEdgesNew = (G<=threshold) $\Omega$new
11. if the number of nonzero pixels in weakEdgesNew is smaller than
12. The largest connected component of weakEdges then
13. $\Omega$ = $\Omega$ $\Omega$new
14. end if
15. Take largest connected component of weakEdges and add it to the
16. closedEdges
17. threshold= mean of G inside the closed contour $\Omega1$
18. weakEdgesTemp = (G<=threshold) $\Omega2$
19. weakEdges = (weakEdgesTempweakEdges) closedEdgesC
20. end while
21. return $\Omega$
end procedure

FIG. 4

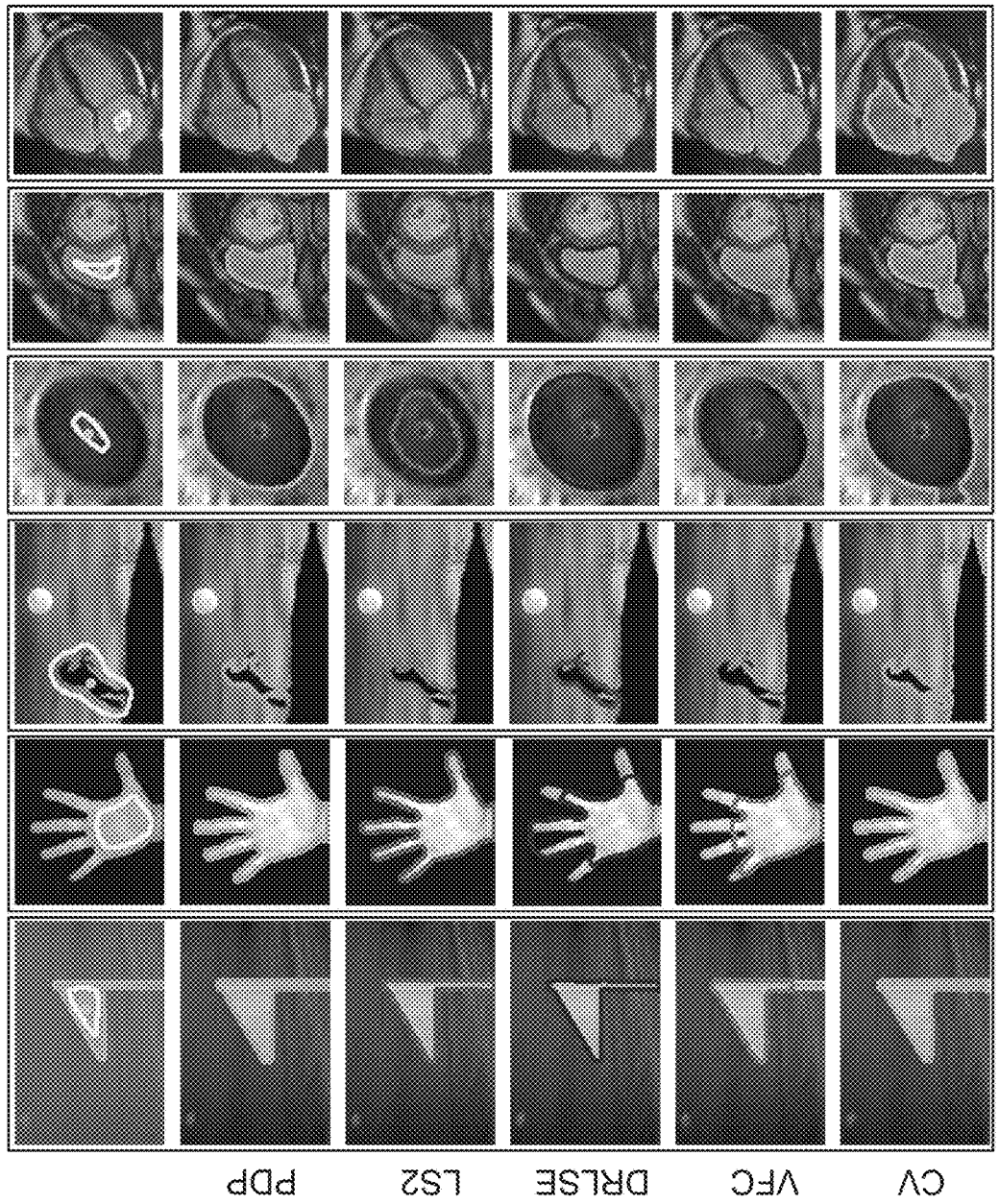

Basal

Mid-RV

Apical

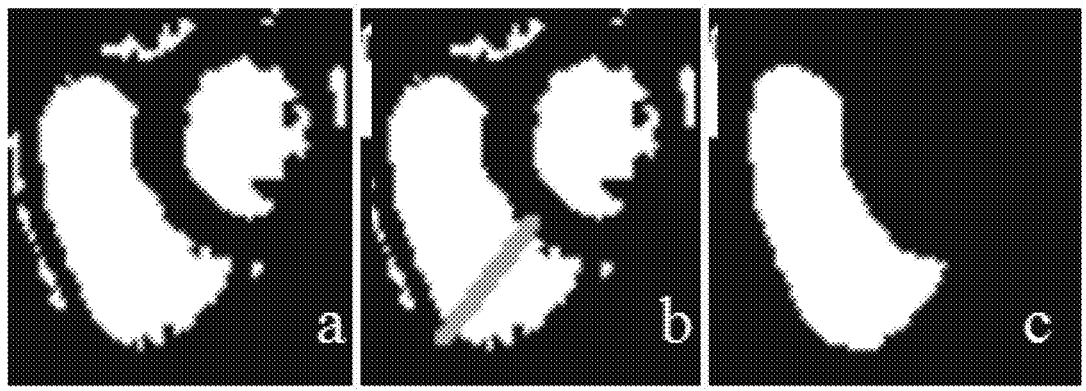
FIG. 22A  FIG. 22B  FIG. 22C
FIG. 22D  FIG. 22E  FIG. 22F
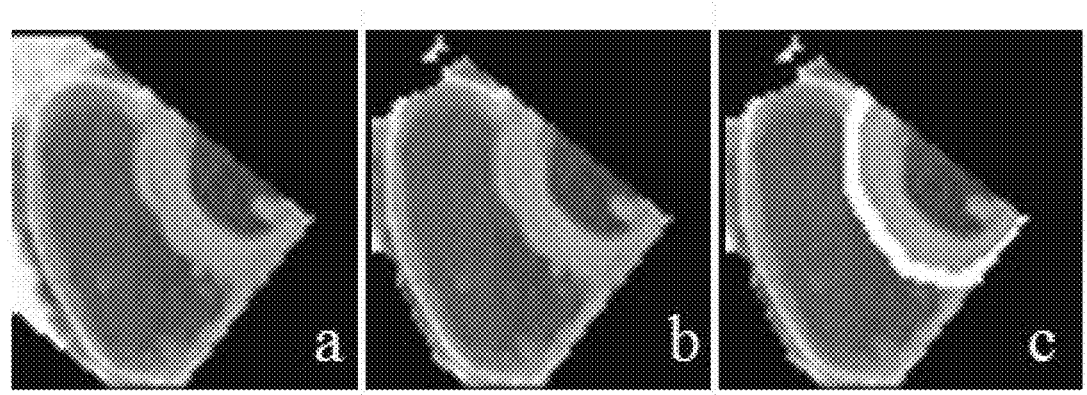
FIG. 23A  FIG. 23B  FIG. 23C

SYSTEM AND METHOD THAT EXPANDS THE USE OF POLAR DYNAMIC PROGRAMMING TO SEGMENT COMPLEX SHAPES

RELATED APPLICATIONS

This application claims the benefit of U.S. Provisional Application No. 62/356,808, filed Jun. 30, 2016, and herein incorporated by reference.

STATEMENT REGARDING FEDERALLY SPONSORED RESEARCH & DEVELOPMENT

This invention was made with government support under NIH Grant No. T32-HL007955 The government has certain rights in the invention.

BACKGROUND OF THE INVENTION

The World Health Organization has identified cardiovascular disease as the leading cause of non-accidental deaths in the world. A heart is identified as diseased when it is not operating efficiently. Early diagnosis of the disease can impact treatment and improve a patient's outcome. An early sign of a diseased heart is a reduction of the heart's pumping ability, which can be measured by doing functional evaluations. These are normally focused on the ability of the ventricles to pump blood to the lungs (right ventricle) or to the entire body (left ventricle).

Non-invasive imaging modalities such as cardiac magnetic resonance (CMR) have allowed the use of quantitative methods for ventricular functional evaluation. The evaluation still requires the tracing of the ventricles, such as at end-diastole and end-systole, in four chamber (4CH) and short axis (SAX) CMR images as shown in FIG. 1.

Even though manual tracing is still considered the gold standard, it is prone to intra- and inter-observer variability and is time-consuming. Therefore, substantial research work has been focused on the development of semi- and fully automated ventricle segmentation algorithms.

In 2009 the Medical Image Computing and Computer-Assisted Intervention (MICCAI) Conference issued a challenge for short axis left ventricle segmentation. A semi-automated technique using polar dynamic programming generated results that were within human variability. This is because a simple path in a polar coordinate system yields a round object in the Cartesian grid and the left ventricle can be approximated as a round object. In 2012 there was an MICCAI right ventricle segmentation challenge, but no polar dynamic programming algorithms were used. This is because polar dynamic programming is best for segmenting round shapes and the right ventricle has a complex shape.

BRIEF SUMMARY OF THE INVENTION

In one embodiment, the present invention provides a system and method that expands the use of polar dynamic programming (PDP) to segment complex shapes.

In another embodiment, the present invention provides a system and method that expands the use of PDP to segment complex shapes by the use of a polar variance.

In another embodiment, the present invention provides a system and method that expands the use of PDP to segment complex shapes by the use of a polar variance that calculates a cumulative variance based on polar region coordinates.

In another embodiment, the present invention provides a system and method that expands the use of PDP to segment complex shapes by the use of a preprocessing step where a polar variance image is calculated from the image.

In another embodiment, the present invention provides a system and method that begins with a simple PDP (sPDP) method to generate a closed contour representing a simple object shape. The first step of the sPDP method is to preprocesses the input image to obtain a polar variance image. The second step is to calculate the cost function needed by the dynamic programming algorithm, which includes generating the cost function in the uniform Cartesian space and later resampling to a uniform polar grid. Next, dynamic programming is used to generate a closed contour representing the object shape. Finally, the PDP algorithm then extends this contour by applying a localized region-growing technique for segmenting complex shapes.

In another embodiment, the present invention provides a system and method that uses polar dynamic programming for the segmentation of the right ventricle.

In another embodiment, the present invention provides a system and method that uses an algorithm designed to segment the RV in 4CH views with the option to include or exclude the trabeculae to accommodate different methods for RV functional analysis.

In another embodiment, the present invention provides a system and method that expands the use polar dynamic programming to segment complex shapes in a framework that uses user-selected or predetermined landmarks.

In another embodiment, the present invention provides a system and method that expands the user of polar dynamic programming to segment complex shapes in a framework where regions may be excluded and interpolated from nearby neighbors.

In another embodiment, the present invention provides a system and method that provide a semi-automated segmentation technique for the right ventricle (RV) that focuses on the segmentation of the RV in four chamber (4CH) views with user-specified inputs.

In another embodiment, the present invention provides a system and method that expands the use polar dynamic programming to segment a ventricle by using a framework that uses landmarks selected in a four chamber view to segment the ventricle in a four chamber view.

In another embodiment, the present invention provides a system and method to delineate and identify and/or use RV landmarks in a 4CH view to automatically segment the RV in a SAX view in a concise framework.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views Like numerals having different letter suffixes may represent different instances of substantially similar components. The drawings generally illustrate, by way of example, but not by way of limitation, a detailed description of certain embodiments discussed in the present document.

FIG. 2B illustrates grayscale and polar variance images of a hand.

FIG. 2C illustrates polar variance images of a SAX.

FIG. 2D illustrates polar variance images of a hand. The dot denotes the object the present invention wishes to outline (RV in FIG. 2A), the entire hand in (FIG. 2B) and is used to calculate the polar variance image. Black in the polar variance images represents low variance.

FIGS. 3A and 3B show how Δθ affects closed contour. For this example, α and β equal 0.5. The dot is the origin used for PDP. Results using a Δθ of (a) 5° and (b) 0.1°. Closed contours have been dilated for viewing purposes.

FIG. 4 provides pseudocode of localized region-growing.

FIGS. 7A, 7B, 7C, 7D, 7E and 7F illustrate non-medical and medical images. From left to right: (a) flag, (b) hand, (c) horse, (d) retina, (e) short axis and (f) 4CH cardiac image. The upper row shows the initialization for the different algorithms. Short axis cardiac images (e) have been cropped for display purposes. The image used for analysis is shown in FIG. 2. Closed contours have been dilated for viewing purposes.

FIG. 18A shows an image in SAX view.

FIG. 18B shows a standard deviation image for the given slice.

FIG. 18C shows a thresholded standard deviation image.

FIG. 18D shows ROI reduction using horizontal profiling.

FIG. 18E shows ROI reduction using vertical profiling.

FIG. 18F shows final ROI used for LV and RV segmentation.

FIGS. 22A, 22B, 22C, 22D, 22E and 22F depict finding candidate origins in a representative slice at ED frame.

FIGS. 23A, 23B and 23C shows gradient image creation. (a) Gradient image, defined by (5.7), where regions that are outside the reduced ROI are removed. (b) Setting air pixels in the gradient image to 0, and (c) high gradient value given to the right lateral portion of the LV epicardial border.

DETAILED DESCRIPTION OF THE INVENTION

Figure 1:
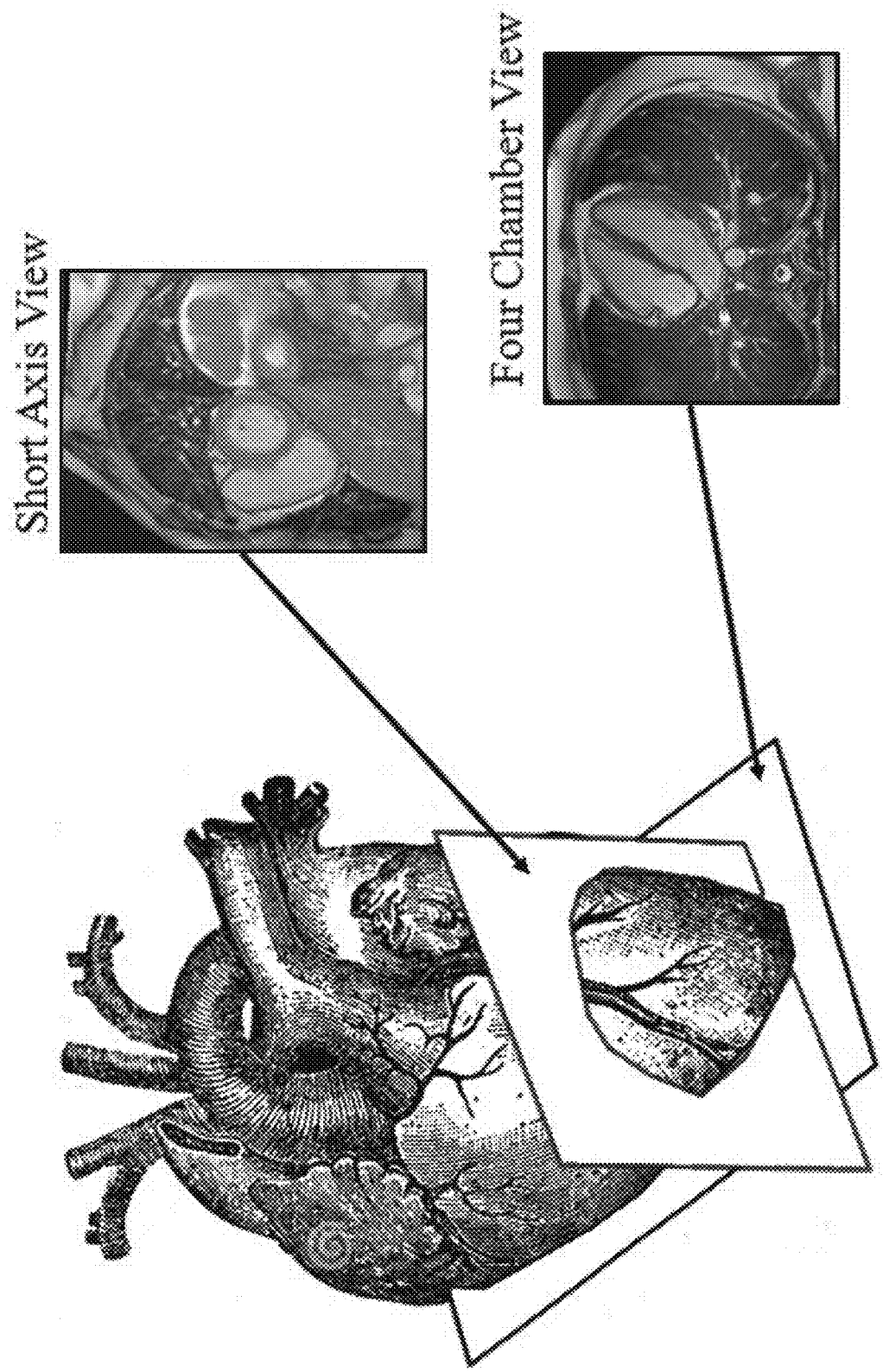
FIG. 1 illustrates viewing angles used for functional RV assessment.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

PDP typically consists of two major drawbacks that prevent it from being used as a general-purpose algorithm. First, it requires training data to constrain the size of the object being segmented. The size constraint helps prevent the closed contour from latching onto high-gradient regions that are not associated with the object. The second major drawback is that the algorithm cannot segment shapes for which rays emanating from the selected origin within the shape intersect the shape boundary in more than one point, for example a hand. To allow the PDP algorithm to segment different-sized objects without needing training data, in one embodiment, the present invention introduces a preprocessing step where a polar variance image is calculated from the image. To allow the algorithm to segment complex shapes, a localized region growing technique extends the segmented region beyond the low-gradient portions of the contour.

In a preferred embodiment, the present invention uses a PDP algorithm that begins with a simple PDP (sPDP) method to generate a closed contour representing a simple object shape. The first step of the sPDP algorithm is to preprocess the input image to obtain a polar variance image. The second step is to calculate the cost function needed by the dynamic programming algorithm. This includes generating the cost function in the uniform Cartesian space and later resampling to a uniform polar grid ($U_p$). The third step is to use dynamic programming to generate a closed contour representing the object shape. The PDP algorithm then extends this contour by applying a localized region-growing technique for segmenting complex shapes.

To obtain closed contours using dynamic programming, prior efforts had to constrain the size of the final segmentation by using training data. Size was constrained because the closed contour may latch onto high-gradient regions that are not associated with the object. Requiring training data to constrain the size of the final segmentation reduces the generalization of the algorithm; therefore, in one aspect, the present invention uses a preprocessing step to generate what is defined as the polar variance image.

Given an image I, the first step is to normalize the intensities from 0 to 1. The present invention then defines each pixel in I as I(x,y) where (x,y) are the coordinates in the uniform grid and G(x,y) is the edge strength of I(x,y). The edge strength with no Gaussian smoothing is generally calculated as $$G(x,y) = |\nabla I(x,y)|^2, \quad (3.1)$$

whereas with Gaussian smoothing the edge strength is calculated as $$G(x,y) = |\nabla[G_\sigma(x,y)*I(x,y)]|^2 \quad (3.2)$$

Here, $G_\sigma(x,y)$ is a 2D Gaussian function with standard deviation $\sigma$, * denotes linear convolution, and $\nabla$ is the gradient operator. The present invention assumes that I(x,y) is scalar (i.e., a grayscale image), but the derivation can be generalized for higher dimensionality. Introducing an origin ($x_o$, $y_o$) allows the present invention to represent I(x,y) and G(x,y) as $f(\theta,\rho)$ and $g(\theta,\rho)$ in polar coordinates as follows:

$$\rho = \sqrt{(x-x_o)^2 + (y-y_o)^2} \quad (3.3)$$

$$\theta = \tan^{-1}\left(\frac{y-y_o}{x-x_o}\right) \quad (3.4)$$

$$f(\theta, \rho) = I(x, y) \quad (3.5)$$

$$g(\theta, \rho) = G(x, y) \quad (3.6)$$

Using the polar representation, the present invention defines the polar variance image as $$V(\theta, \rho) = \int_0^\rho \int_{\theta-\gamma}^{\theta+\gamma} (f(\phi, r) - \bar{f}(\phi, r))^2 dr d\phi \text{ where} \quad (3.7)$$

-continued $$\bar{f}(\theta, \rho) = \int_0^\rho \int_{\theta-\gamma}^{\theta+\gamma} f(\phi, r) dr d\phi \quad (3.8)$$

Figure 2A:
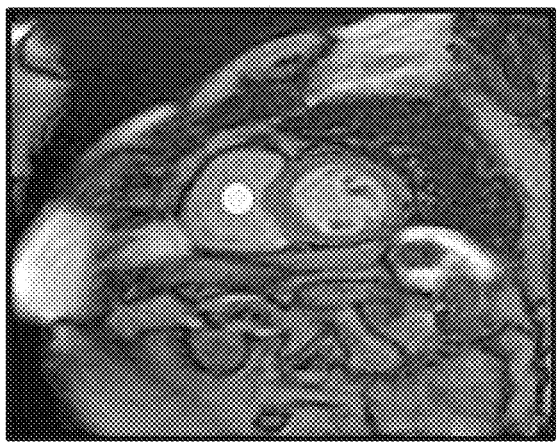
FIGS. 2A-2D illustrate grayscale and polar variance images.
Figure 2B:
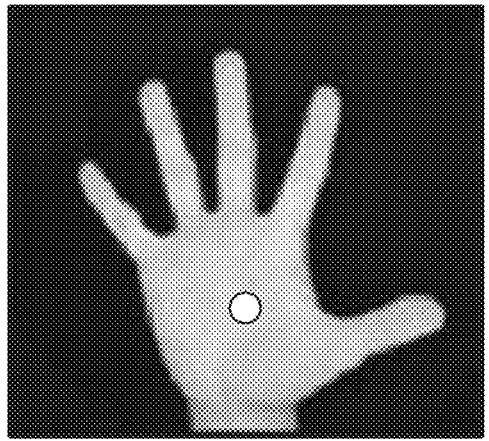
Figure 2C:
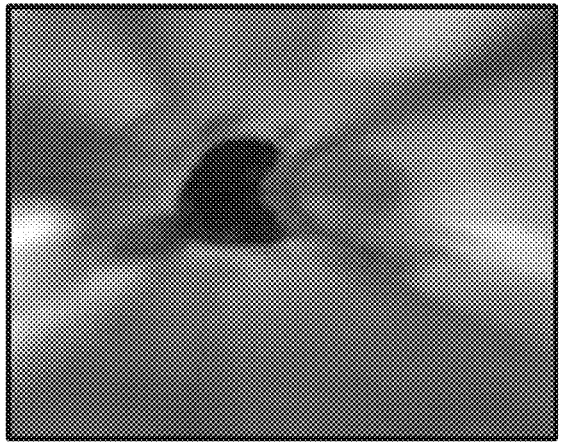
Figure 2D:
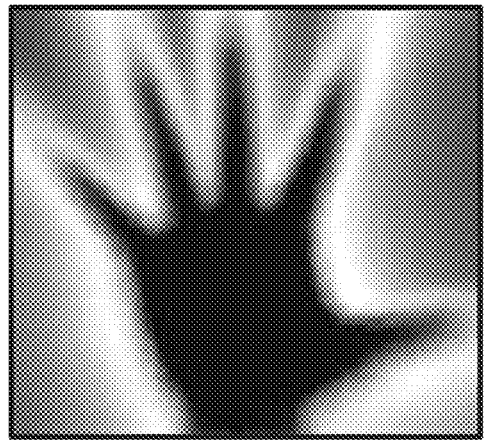

In these equations, γ is a smoothing parameter. The higher γ is, the more smoothed the polar variance image will be. Note that the polar variance image is cumulative because the integral spans radii from the origin to the pixel being analyzed. Although variance as a feature has been used for segmentation and as a preprocessing technique, the present invention, in one embodiment, provides a segmentation algorithm that calculates a cumulative variance based on polar region coordinates. FIGS. 2A-2D show the results of the polar variance image for two different scenarios. The SAX cardiac MR image, shown in FIG. 2A, contains high-gradient regions that are not part of the RV (i.e. the object with the dot). FIG. 2B shows an image where rays emanating from an origin (the dot) will intersect the hand boundary in more than one point. FIG. 2C shows the polar variance image of FIG. 2A. Note that the RV has low variance values, whereas high gradient regions that are not associated with the RV have high variance values. FIG. 2D shows the polar variance image of FIG. 2B. Note that the polar variance image does not have low values in the entire hand boundary just in the regions where the rays intersect the shape boundary at only one point.

The gradient and variance values are the features that will be optimized using dynamic programming. As a general rule, for some embodiments of the present invention, the variance values inside the closed contour should be low, and the gradient values along the contour should be high. Therefore, the present invention defines the cost function as $$C(\theta,\rho) = \alpha V(\theta,\rho) + \beta \exp(-g(\theta,\rho)) \quad (3.9)$$

where α and β are parameters for determining the importance of each feature.

To use dynamic programming, the present invention uses a uniform grid. Due to the discrete nature of I, its polar representation is not uniformly sampled. Therefore, the present invention resamples the image onto a uniform polar grid ($U_p$), which is the lattice comprising points ($\theta_i$, $\rho_j$)= ($i\Delta\theta, j\Delta\rho$) that span the image domain. The present invention derives the sampling intervals ($\Delta\rho$ and $\Delta\theta$) to ensure that the polar grid has sufficient resolution to localize each pixel in the rectangular grid. First, the present invention finds the (x,y) coordinates that are farthest from the origin ($x_o$, $y_o$). The present invention then considers a neighboring pixel (e.g., this could be the pixel at (x−1, y) if the farthest point is at the upper-right corner), and then the present invention computes the absolute radial difference between these two farthest pixels, which indicates the maximum radial sampling interval required to resolve two nearby pixels:

$$\Delta\rho_{max} = |\sqrt{(x-x_o)^2+(y-y_o)^2} - \sqrt{(x-1-x_o)^2+(y-y_o)^2}| \quad (3.10)$$

$$\Delta\rho_{max} \cong \sqrt{2}/2 \quad (3.11)$$

As a general rule, the $\Delta\rho$ used for analysis is a rational number smaller than $\Delta\rho_{max}$. The present invention uses $\Delta\rho = 0.5$.

As a general rule, the smaller the angular sampling interval ($\Delta\theta$), the bigger the maximum allowed curvature of the extracted contour. To find the minimum $\Delta\theta$ required to localize every pixel in the image, the present invention finds the angular difference between the two neighboring pixels farthest from the origin:

$$\Delta\theta_{min} = \left|\tan^{-1}\left(\frac{y-y_o}{x-x_o}\right) - \tan^{-1}\left(\frac{y-y_o}{x-1-x_o}\right)\right| \quad (3.12)$$

The $\Delta\theta$ values used for analysis are multiples of $\Delta\theta_{min}$. Unlike active contours, the cost function (3.9) does not explicitly minimize the curvature of the extracted contour. Instead, the curvature of the contour of the segmented object is based on the value of $\Delta\theta$ selected. FIG. 3 shows how the $\Delta\theta$ value affects the curvature of the contour.

For each point $(\theta_i, \rho_j) \in U_p$ the present invention computes the corresponding Cartesian coordinates as $$x = \rho_j \cos(\theta_i) \quad (3.13)$$

$$y = \rho_j \sin(\theta_i) \quad (3.14)$$

Then the present invention uses bilinear interpolation to generate the cost function $(C_p(\theta_i, \rho_j))$ from the cost function values at the four pixels that surround the point (x,y) in the Cartesian space.

After generating a uniformly sampled polar representation of the cost function $(C_p)$, the next step is to use dynamic programming to compute the object contour by finding a path. This path, denoted as $\rho_{path}(\theta_i)$, is a function of $\theta_i$ because the path will pass through only one radius value for each $\theta_i$. Also, the absolute radial difference between adjacent angles will be $\Delta\rho$ or 0. The general approach is to find the radii that minimize the cumulative sum of the cost function $(C_p)$. To obtain a closed contour, the $\rho_{path}$ values associated with $\theta_i = 0°$ and $\theta_i = 360°$ must be the same. To add this constraint to the dynamic programming, the present invention uses a technique which consists of extending $\theta_i$ in a periodic fashion from [0°, 360°] to [−360°, 720°]. This extended version of the cost function is referred to as $C_p^*$.

Given $C_p^*$, the present invention initializes the cumulative sum $M_p$ as follows. To initialize, the present invention lets $M_p(-360°, \rho_j) = C_p^*(-360°, \rho_j)$ for each $\rho_j$. The other $M_p$ values are recursively computed:

$$M_p(\theta_i, \rho_j) = \min\{M_p(\theta_i - \Delta\theta, \rho_j), M_p(\theta_i - \Delta\theta, \rho_j), \quad (3.15)$$
$$M_p(\theta_i - \Delta\theta, \rho_j + \Delta\rho)\} + C_p^*(\theta_i, \rho_j)$$

for each $\theta_i \in (-360°, 720°]$ and for each $\rho_j$.

Once $M_p$ has been generated, $\rho_{path}$ is initialized as follows:

$$\rho_{path}(720°) = \operatorname*{argmin}_{\rho} M_p(720°, \rho) \quad (3.16)$$

The rest of the path, for $\theta_i \in [-360°, 720°)$, is created as follows:

$$\rho_{path}(\theta_i) = \operatorname*{argmin}_{\substack{\rho \in \{\rho_{path}(\theta_i + \Delta\theta), \\ \rho_{path}(\theta_i + \Delta\theta) + \Delta\rho, \\ \rho_{path}(\theta_i + \Delta\theta) - \Delta\rho\}}} M_p(\theta_i, \rho) \quad (3.17)$$

Note that $\rho_{path}$ is defined for $\theta_i \in [-360°, 720°]$, just like $M_p$. To generate the closed contour, the present invention only keeps $\rho_{path}$ for $\theta_i \in [0°, 360°)$. To convert to the Cartesian coordinate system, the present invention uses (3.12) and (3.13) to convert $\rho_{path}$ and $\theta_i$ to x and y.

In case a single $\Delta\theta$ does not suffice, the present invention generates a closed contour using multiple $\Delta\theta$ values (i.e., multiple curvature values), which are multiples of $\Delta\theta_{min}$, as discussed above. The present invention selects the $\Delta\theta$ value that optimizes a cost function as follows:

$$\Delta\theta^* = \operatorname*{argmin}_{\Delta\theta}\left(\alpha \int_{\Omega_1} V(x,y) dx dy + \beta \int_{\Omega_2} \exp(g(x,y)) dx dy\right) \quad (3.18)$$

where $\Omega_1$ is the interior of the extracted closed contour and $\Omega_2$ is the extracted closed contour. The present invention defines the union of $\Omega_1$ and $\Omega_2$ as the mask, $\Omega = \Omega_1 \cup \Omega_2$.

The simple PDP algorithm (sPDP) can segment simple shapes for which rays emanating from an origin within the shape intersect the shape boundary at one point without the need for training data. However, this technique may generate undersized contours in the case of complex shapes. To segment complex shapes, the present invention, in a preferred embodiment, grows the extracted closed contour $(\Omega_2)$ using the localized region growing procedure shown in FIG. 4. The procedure begins by localizing weak sub-contours (FIG. 4 line 2). A weak sub-contour is a region in $\Omega_2$ that has a gradient magnitude less than or equal to the mean gradient magnitude in $\Omega_1$. For each weak sub-contour, the present invention runs SPDP with a new origin located on the weak sub-contour to produce a new mask ($\Omega$new) (FIG. 4, lines 8-9). If the total length of the weak sub-contours in the new mask is less than the length of the weak sub-contour that is being grown, new mask is kept (FIG. 4, lines 11-14) and the present invention then marks the weak sub-contour that is being grown as closed (FIG. 4, line 15-16). The present invention identifies any new weak sub-contours that will be grown (FIG. 4, line 19), and proceeds to the next weak sub-contour. This is repeated until all the weak sub-contours have been examined.

The extended version of the PDP was compared to several segmentation algorithms using a variety of tests. The first test measured the robustness to additive Gaussian noise. The second test measured segmentation accuracy using different grayscale images. The final test showed the robustness to algorithm-specific parameters.

The performance metrics used were the Dice metric and the average border positioning error (BPE). The Dice metric finds the mutual overlap between the mask generated by the automated algorithm of the present invention and the mask generated by manual segmentation (i.e., ground truth). The average BPE gives the mean difference (in pixels) between the automated and manual contours. An automated mask that perfectly matches the manual mask will yield an average Dice value of 1 and an average BPE of 0 pixels.

To achieve the best performance, the proper set of parameters needs to be used. Table 3.1 shows the algorithm-specific parameters that will be tuned to compare the algorithms. The PDP method uses the following parameters: $\gamma$, $\Delta\rho$, $\Delta\theta$, $\alpha$, $\beta$, $\sigma$. For the images used (100×100 pixels), the present invention uses $\gamma = 5°$ and $\Delta\rho = 0.5$ pixels. To further reduce the search space, the present invention lets $\beta = 1 - \alpha$. Even though (3.17) allows the PDP algorithm to handle multiple curvatures, for simplicity the present invention used only one curvature value for the parameter selection. Note that the $\Delta\theta$ values shown in Table I are multiples of $\Delta\theta_{min}$. For the images used, $\Delta\theta_{min} = 0.1°$.

Aside from the parameters, the L2S, DRLSE, VFC and CV algorithms require a mask, whereas PDP requires an origin, $(x_o, y_o)$.

TABLE 3.1

Algorithm-Specific Parameters

| Technique | Parameters | Description | Values |
|---|---|---|---|
| PDP | $\Delta\theta$ | Allowed curvature | 0.1, 0.5, 1, 2, 3, 4, 5 |
|  | $\alpha$ | Variance image weight | From 0 to 0.9, $\Delta = 0.1$ |
|  | $\sigma$ | Gaussian kernel smoothing | 0, 1.5 |
| L2S | m | Legendre polynomial order | 2, 3 |
|  | $\lambda_1, \lambda_2$ | Regularization constraints ($\lambda_1 = \lambda_2$) | From 1 to 100, $\Delta = 2$ |
|  | v | Contour smoothness constraint | From 0.05 to 0.6, $\Delta = 0.05$ |
| DRLSE | $\lambda$ | Line integral coefficient | From 0 to 10, $\Delta = 1$ |
|  | $\alpha$ | Area coefficient ($\alpha < 0$ expands, $\alpha > $ shrinks). | From −10 to 10, $\Delta = 1$ |
|  | $\sigma$ | Gaussian kernel smoothing | 0, 1.5 |
| VFC | $\tau$ | Gradient edge threshold | From 0.1 to 0.8, $\Delta = 0.1$ |
|  | $\alpha$ | Curvature weight | From 0 to 1, $\Delta = 0.1$ |
|  | $\gamma$ | VFK decay coefficient | From 1.5 to 3, $\Delta = 0.5$ |
|  | R | VFK radii, based on the size of the image (N is the size of the image). | N/8, N/7, N/6, N/5, N/4, N/3, N/2 |
|  | $\sigma$ | Gaussian kernel smoothing | 1.5 |
| CV | $\lambda_1, \lambda_2$ | Regularization constraints ($\lambda_1 = \lambda_2$) | From 1 to 100, $\Delta = 2$ $\Delta$ is the uniform |
|  | v | Contour smoothness constraint increment. | From 0.05 to 0.6, $\Delta = 0.05$ |

Figure 5C:
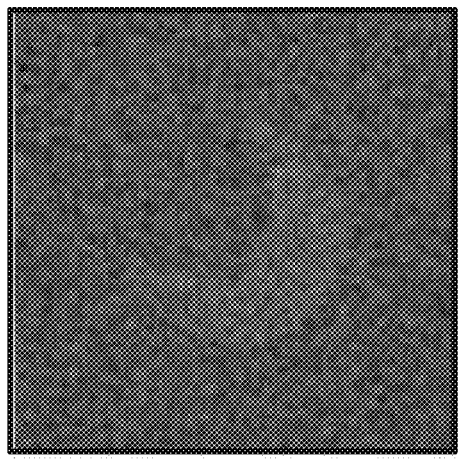
FIG. 5C illustrates a simulated image with a SNR value of 0 dB.
Figure 5B:
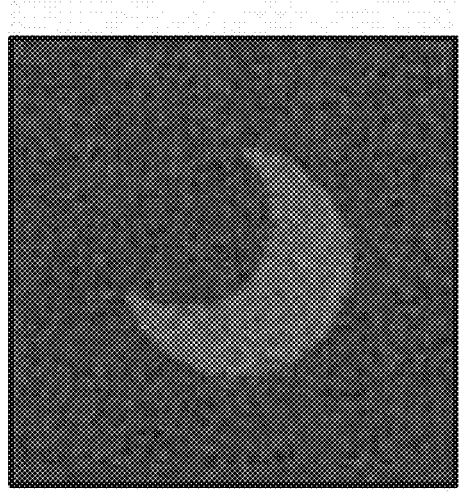
FIG. 5B illustrates a simulated image with a SNR value of 5 Db.
Figure 5A:
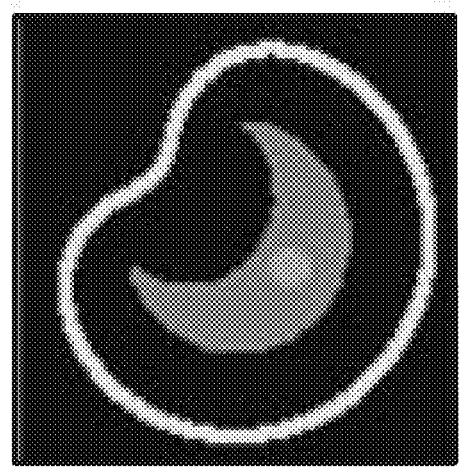
FIG. 5A illustrates a simulated image with a SNR value for ∞, with the outline for the initial closed contour used for L2S, DRLSE, VFC and CV; dot is the origin location used for PDP. Closed contour has been dilated for viewing purposes.

To evaluate the performance of PDP under additive Gaussian noise, a zero-mean Gaussian noise is added to a simulated crescent-shaped object, shown in FIG. 5A, using 11 different signal-to-noise ratio (SNR) levels in the 0-10 dB range. The SNR is calculated in terms of the mean intensity values as $$SNR = 10\log_{10}\left(\frac{|\mu_{object} - \mu_{backgrround}|}{\sigma_{background}}\right) dB \quad (3.19)$$

Figure 6A:
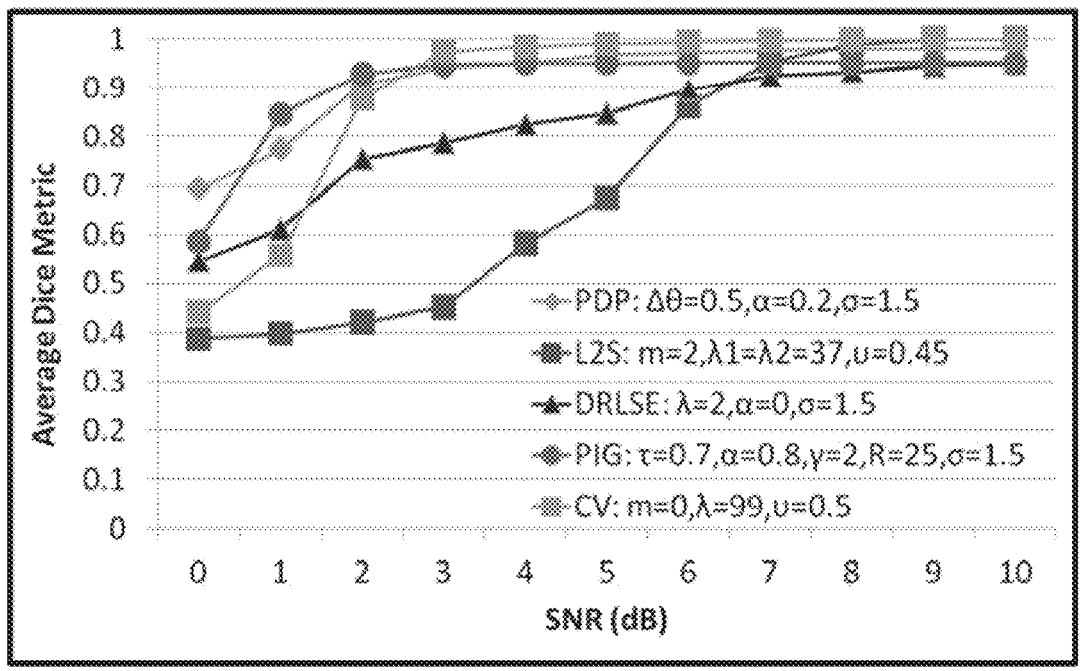
FIG. 6A illustrates noise sensitivity performance analysis for an average Dice performance. One hundred noisy images were created for each SNR level by adding Gaussian noise to the image shown in FIG. 5A.
Figure 6B:
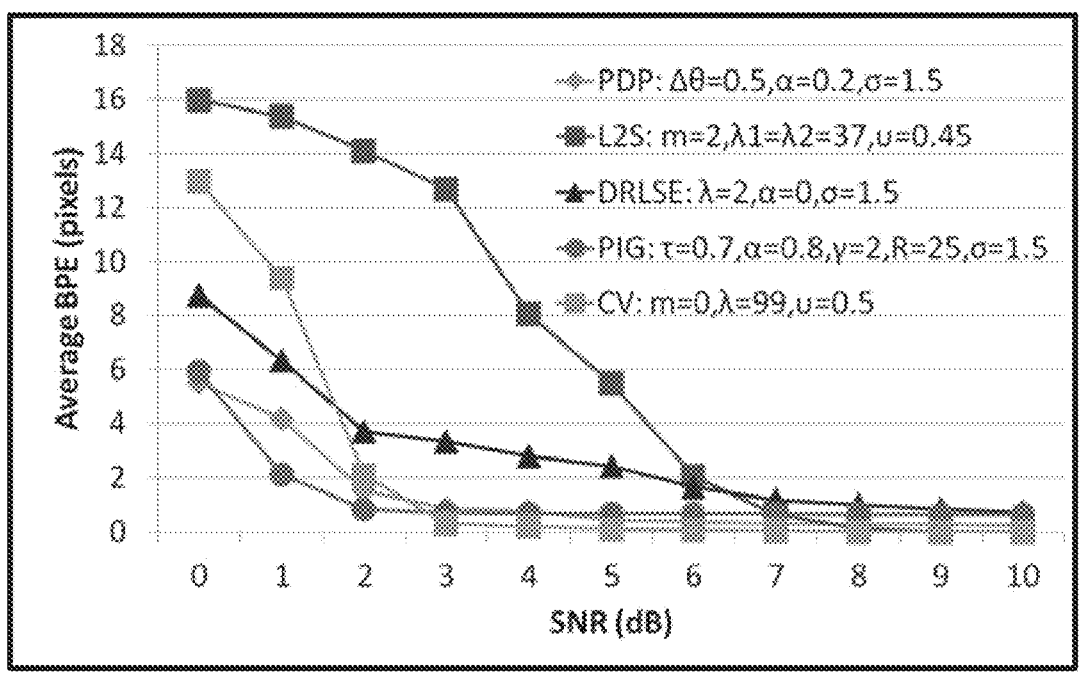
FIG. 6B illustrates noise sensitivity performance analysis for average border positioning error (BPE) in pixels. One hundred noisy images were created for each SNR level by adding Gaussian noise to the image shown in FIG. 5A.

To ensure that the results are statistically significant, 100 noise realizations at each SNR level were used. FIGS. 5B and 5C show an instantiation of the 5 dB and the 0 dB cases. To find the parameters for the different algorithms, the present invention randomly selected an image from each of the 11 noise levels and selected the set of parameters (shown in Table 3.1) that gave the best mean Dice metric. FIG. 5A shows the initial contour used for L2S, DRLSE, and CV and the origin (shown as a dot) required for PDP. The results (i.e., average Dice and average BPE) for all the algorithms for different SNR levels are shown in FIGS. 6A-6B. At low SNR, the PDP and VFC algorithms perform the best, and at high SNR CV and L2S perform the best. One explanation for the low performance for CV and L2S at low SNR is that they do not smooth the input image as a preprocessing step and thus can be influenced by high noise. Conversely, the absence of smoothing allows these algorithms to generate good results at higher SNR levels.

To evaluate the performance of the algorithms with different grayscale images, the present invention used the non-medical and medical images shown in FIGS. 7A-7E. The first row shows the initial contour for L2S, DRLSE, CV, as well as the initial origin (dot) used for PDP. The other rows show the closed contours obtained with the PDP, L2S, DRLSE, VFC, and CV algorithms. In FIGS. 7E and 7F, the algorithms are outlining the right ventricle and left atrium on cardiac MR images, respectively. The Dice metric and average BPE for the images are shown in Table 3.2. The present invention is able to segment high-curvature objects with well-defined edges similar to L2S or CV (e.g., FIGS. 7A-7C), while also being able to segment lower curvature objects with lower contrast (e.g., FIGS. 7D-7F), similar to the VFC algorithm. Table 3.2 Performance of Segmentation Algorithms

|  | Flag |  | Hand |  | Horse |  | Retina |  | SAX RV |  | 4CH left atrium |  |
|---|---|---|---|---|---|---|---|---|---|---|---|---|
| Technique | Dice | BPE | Dice | BPE | Dice | BPE | Dice | BPE | Dice | BPE | Dice | BPE |
| PDP | 0.9631 | 0.5213 | 0.9491 | 0.7190 | 0.8733 | 1.1024 | 0.9947 | 0.2172 | 0.9543 | 0.7172 | 0.9549 | 0.8186 |
| L2S | 0.9399 | 0.8163 | 0.9762 | 0.3451 | 0.7761 | 1.7970 | 0.5694 | 13.3977 | 0.8701 | 2.4988 | 0.7351 | 5.6670 |
| DRLSE | 0.9159 | 1.1163 | 0.8662 | 2.4240 | 0.8587 | 1.1323 | 0.9895 | 0.4297 | 0.9371 | 0.9655 | 0.1964 | 37.1450 |
| VFC | 0.9018 | 2.0213 | 0.8822 | 2.7598 | 0.8756 | 0.9699 | 0.9983 | 0.0685 | 0.9394 | 0.9195 | 0.9335 | 1.2021 |
| CV | 0.9471 | 0.7340 | 0.9741 | 0.3798 | 0.2618 | 21.4422 | 0.9324 | 2.4891 | 0.8484 | 2.7902 | 0.5187 | 12.0072 |

Quantitative Performance for Images Shown in FIGS. 7A-7F.

Figures 8A, 8B, 8C:
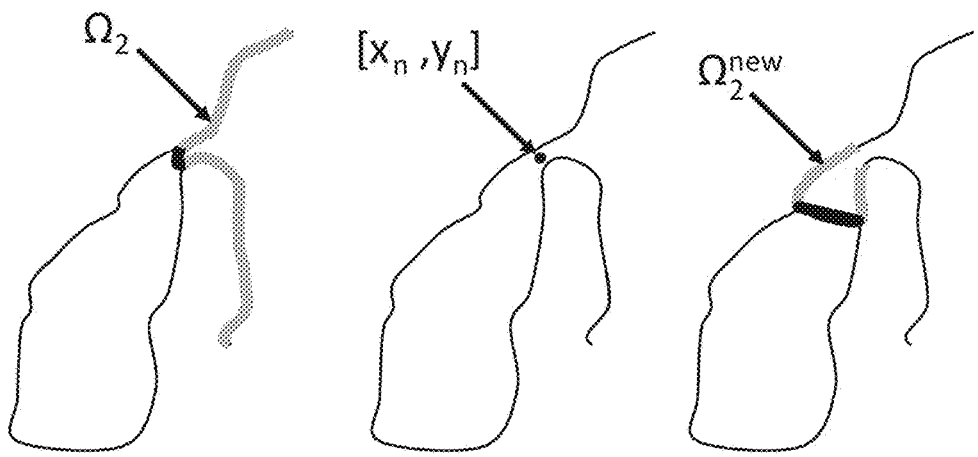
FIGS. 8A, 8B and 8C provide a schematic of the tail region of the horse shown in FIG. 7C. The thin black line represents the high gradient region, and the white background is the low gradient region. (a) The thick gray line shows part of the high gradient extracted contour of the original mask. The thick black line is the weak sub-contour. (b) The dot is the new origin positioned in the middle of the weak sub-contour shown in (a). (c) The thick gray line is the high-gradient extracted contour that does not intersect with the original mask, (a).

The main limitation of the PDP algorithm is shown in FIGS. 8A-8C, which provide schematics of the tail region of the horse shown in FIG. 7C. Given a weak sub-contour, shown as a thick black line in FIG. 8A, the localized region-growing finds a new origin, shown in FIG. 8B, and generates a new mask. To add the new mask ($\Omega''$) to the prior mask ($\Omega$), the number of low-gradient pixels in the new extracted closed contour must be less than the number of pixels in the weak sub-contour. Since the sPDP segmentation finds the optimum path, given that the rays emanating from the new origin within the shape intersect the shape boundary in one point, the new mask is not the entire tail, but a subsection of the tail, shown in FIG. 8C. Since the weak gradient region of the new mask, shown as a thick black line in FIG. 8C, is bigger than the weak sub-contour, the weak sub-contour is marked as closed and thus the algorithm fails to outline the horse tail.

Aside from the segmentation accuracy, the robustness of the algorithm-specific parameters shown in Table 3.1 were also evaluated. The parameters that generated the masks, as shown in FIGS. 7A-7F, were selected and changed by ±1, ±5, ±10 and ±15 percent. Table 3.3 shows the mean difference between the performance metrics given the change in parameters. These changes were done with some constraints (shown in Table 3.3) to generate valid values. For example, in PDP and DRLSE there can be smoothing ($\sigma=1.5$) or no smoothing ($\sigma=0$). Non-positive a values are not valid; therefore, in cases where a non-smoothed gradient ($\sigma=0$) generated the best result, $\sigma=0.01, 0.05, 0.1, 0.15$ were used instead.

Positive values in Table 3.3 show performance degradation, meaning that the masks generated with the new parameters yielded a smaller Dice metric or higher average BPE than the ones generated with the initial parameter. A negative value (i.e., improvement) means that using the new parameter generated a mask with either a higher Dice metric or a lower average BPE than the initial parameter. There are cases where the Dice metric gives a positive value while the average BPE shows a negative value. This is because the present invention is using the parameters that optimize the Dice metric, not the average BPE.

As seen in Table 3.3, the performance of PDP is mostly influenced by a. As a general rule, the value of a should be selected as follows. To segment an object with one mode (e.g., FIG. 7E) the value of $\alpha$ should be in the 0.6-0.9 range. When segmenting an object that has more than one mode, but its gradient magnitude is high compared to the background (e.g., FIG. 7D), the value of $\alpha$ should be in the 0-0.3 range. For high-curvature objects (e.g., FIG. 7B), a $\Delta\theta$ value close to $\Delta\theta_{min}$ should be used. For low-curvature objects, $\Delta\theta$ should be a multiple of $\Delta\theta_{min}$. Even though changing $\Delta\theta$ resulted in a Dice metric improvement, the improvement is negligible.

The L2S algorithm was not affected by changes to $\lambda_1$ and $\lambda_2$; for v the degradation was fairly small. A change of ±15% in v produced a degradation of less than 5% in the mean Dice metric and a bias of less than 2 pixels for average BPE. For L2S the polynomial order (m) turned out to be a sensitive parameter in this set of images. Unlike most of the parameters shown in Table 3.1, m could only have two possible values, 2 or 3. The present invention quantified the effect on the performance by using the incorrect polynomial order (e.g., m=2 instead of m=3 for L2S). Using this approach, the embodiments of the present invention observe on average a degradation of 0.2 in the Dice metric for selecting the wrong polynomial order.

All the DRLSE parameters were sensitive to small variations. The performance for VFC was sensitive to all the parameters except a. The main problem of the algorithm was the inability to generate an initial closed contour that was on the object the present invention wanted to segment. This is one of the main drawbacks of using a purely automated method for creating the mask. The most robust algorithm was CV. It was robust to changes in $\lambda_1$, $\lambda_2$ and v. A change of ±15% in v resulted in less than a 1% in degradation in the Dice metric and a bias of less than 0.01 pixel.

TABLE 3.3

Robustness to Changes in Algorithm-Specific Parameters

| Technique | Parameters | Constraints | ±1% ΔDice | ±1% ΔBPE | ±5% ΔDice | ±5% ΔBPE | ±10% ΔDice | ±10% ΔBPE | ±15% ΔDice | ±15% ΔBPE |
|---|---|---|---|---|---|---|---|---|---|---|
| PDP | Δθ | Δθ >0 | −0.0019 | −0.0179 | −0.0020 | −0.0238 | −0.0016 | −0.0253 | −0.0026 | −0.0348 |
|  | α | 0 ≤ α < 1 | 0.0037 | 0.0732 | 0.0122 | 0.1978 | 0.0904 | 1.6847 | 0.094 | 1.8223 |
|  | σ | σ >0 | −0.0004 | −0.0046 | 0.0076 | 0.1158 | 0.0076 | 0.1188 | 0.0138 | 0.2052 |
| L2S | m | If $m_{old}=2$ $m_{new}=3$ if $m_{old}=3$ $m_{new}=2$ | 0.1810 | 3.1189 | 0.1810 | 3.1189 | 0.1810 | 3.1189 | 0.1810 | 3.1189 |
|  | $\lambda_1, \lambda_2$ | $\lambda_1, \lambda_2$ >0 | 0 | 0 | 0 | 0 | 0 | 0 | 0 | 0 |
|  | v | 0 ≤ v ≤ 1 | 0.0001 | 0.0005 | 0.0002 | 0.0062 | 0.0384 | 1.2301 | 0.044 | 1.7981 |
|  | λ | λ >0 | 0.0359 | 1.7321 | 0.0453 | 2.3018 | 0.0999 | 3.997 | 0.2402 | 8.0538 |
| DRLSE | α | if $\alpha_{old}$ >0, $\alpha_{new}$ >0 if $\alpha_{old}$ <0, $\alpha_{new}$ <0 | 0.0379 | 2.0672 | 0.0598 | 2.4183 | 0.1819 | 4.3407 | 0.2158 | 5.1481 |
| VFC | σ | σ >0 | 0.1118 | 4.6195 | 0.1585 | 7.385 | 0.1136 | 5.2672 | 0.1283 | 5.8768 |
|  | τ | 0 ≤ τ < 0.8 | 0.0793 | 4.3448 | 0.1025 | 9.1074 | 0.1691 | 8.7681 | 0.2097 | 15.0553 |
|  | α | 0 ≤ α ≤ 1 | 0.0018 | 0.0691 | 0.0040 | 0.1397 | 0.0026 | 0.1051 | 0.0026 | 0.0941 |
|  | γ | γ >0 | 0.0068 | 0.1474 | 0.0882 | 4.5255 | 0.0931 | 4.6330 | 0.0970 | 4.6336 |
|  | R | R >0 | 0.0814 | 4.4366 | 0.0824 | 4.3897 | 0.0859 | 4.4776 | 0.0923 | 4.5874 |
|  | σ | σ >0 | 0.1681 | 8.6817 | 0.1997 | 9.2172 | 0.1799 | 8.3331 | 0.1667 | 8.7000 |
| CV | $\lambda_1, \lambda_2$ | $\lambda_1, \lambda_2$ <0 | 0 | 0 | 0 | 0 | 0 | 0 | 0 | 0 |
|  | v | 0 ≤ v ≤ 1 | 0.0014 | 0.0226 | 0.0011 | −0.0149 | −0.0016 | −0.0047 | 0.0013 | 0.0078 |

Change in Dice Metric and BPE when the Parameters Used in FIGS. 7A-7F are Altered by ±1,5,10,15%.

The present invention provides a system and method that includes an algorithm that uses PDP to outline complex shapes. By introducing a polar variance image, the present invention is not required to constrain the size of the object for correct boundary delineation, something that previous implementations of PDP were not able to accomplish. The present invention can segment high curvature objects, while also segmenting low-gradient objects. The embodiments of the present invention performed favorably when compared to other segmentation algorithms.

In other embodiments, the present invention provides a novel segmentation algorithm for the RV in 4CH CMR images so that the segmented images may be used to evaluate RV function. An advantage of using standard 4CH views is that the relevant RV landmarks (i.e., TV plane, apex and free wall) are visible in the 4CH views and there is no need to change the existing CMR protocols. The embodiment, in one aspect, uses anatomical constraint lines and user-provided landmarks to segment the RV.

Figure 9:
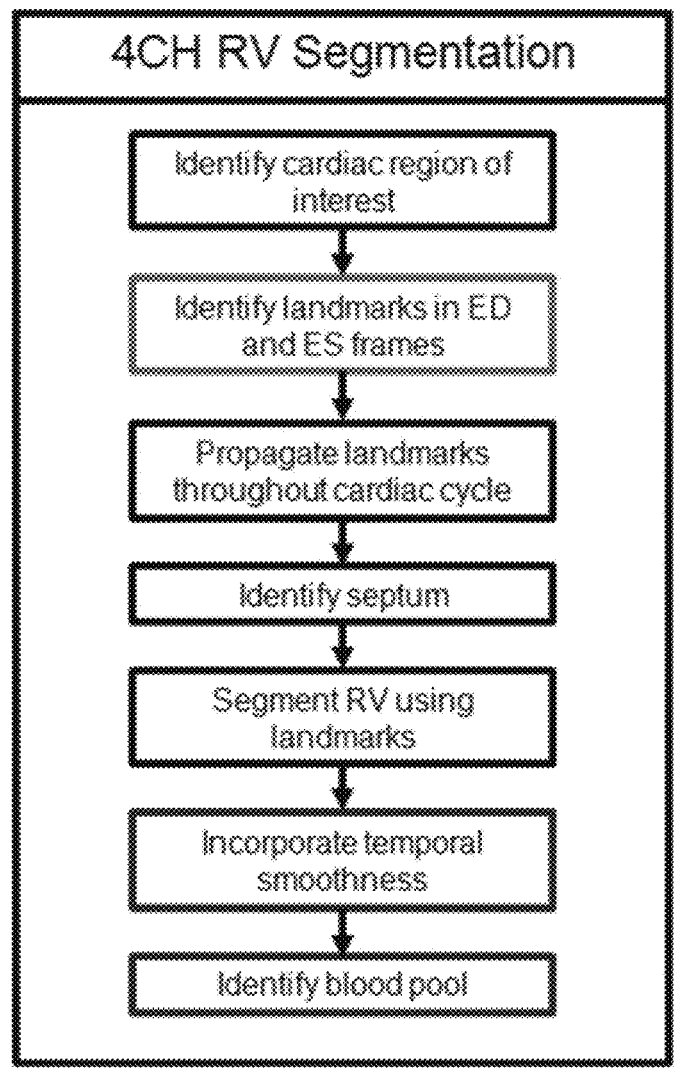
FIG. 9 provides a 4CH Segmentation Flowchart. The second step denotes the module that requires user interaction; steps 6 and 7 denote optional modules.
Figure 10A:
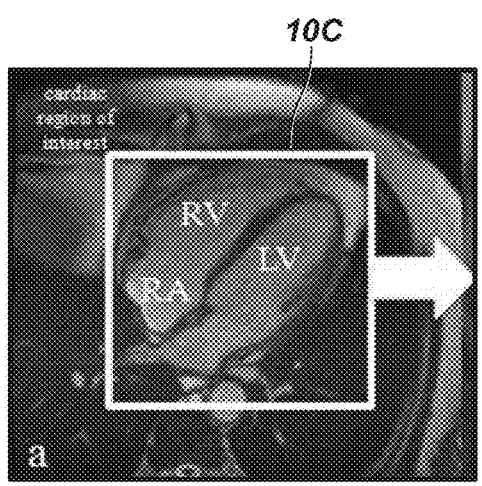
FIGS. 10A, 10B, 10C and 10D illustrate ROI as the bounding box of the largest connected component.
Figure 10C:
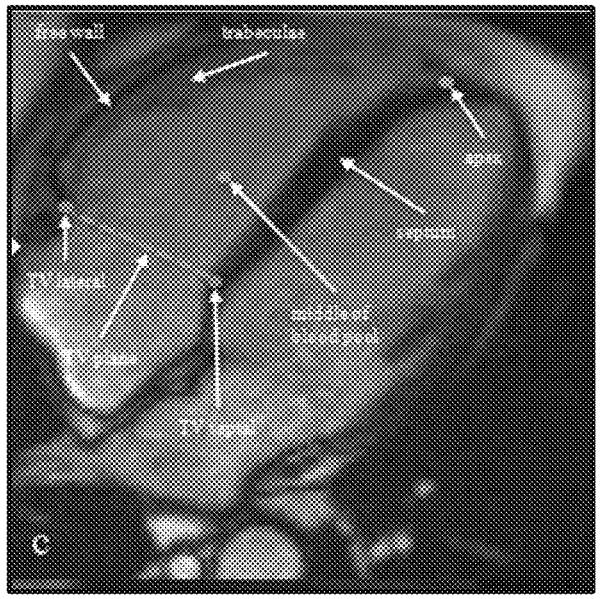
Figure 10B:
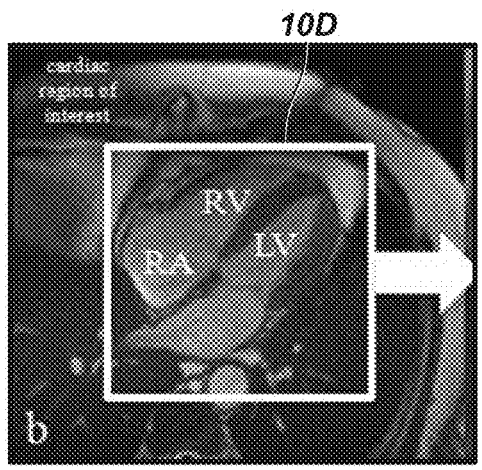
Figure 10D:
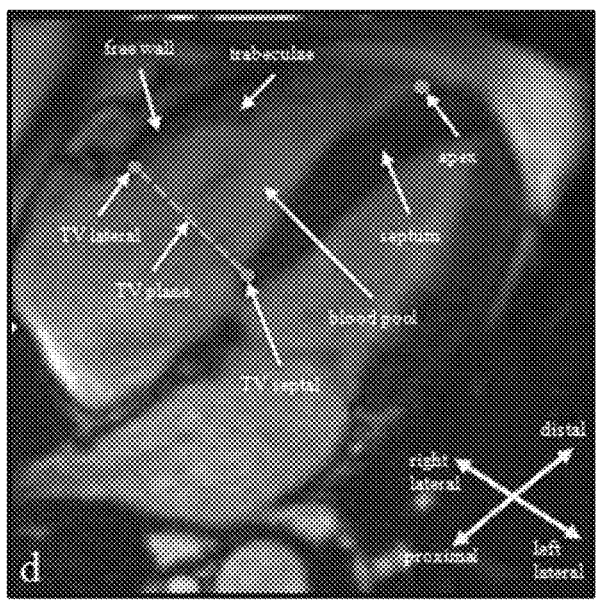

The technique consists of the following steps: (1) automatic segmentation of the cardiac region of interest (ROI); (2) user identification of the ED and ES frames along with the appropriate landmarks; (3) automatic propagation of landmarks throughout the cardiac cycle; (4) automatic identification of the septum and (5) final segmentation of the RV (given the septum and the propagated landmarks). (6) The semi-automated RV segmentation masks can be smoothed in the temporal axis to produce a temporally smoothed segmentation mask. (7) As an optional feature, the proposed technique can exclude the trabeculae if needed, when the user chooses to focus only on the blood pool (BP) part of the RV. These steps are outlined in FIG. 9. The second step denotes the module that requires user interaction; steps 6 and 7 denote optional modules.

The proposed technique consists of the following steps: The first step is to identify the cardiac ROI. Consider a 4CH image sequence of the cardiac cycle, where each pixel is defined as I(x,y,n) where n is the frame number and (x,y) are the coordinates within the given frame. To automatically identify the cardiac ROI, the present invention identifies the pixels where there is motion—specifically, the present invention checks for a high standard deviation of pixel intensity throughout the cardiac cycle. The standard deviation image is defined as $$\sigma_I(x, y) = \sqrt{\frac{1}{N-1} \sum_{i=1}^{N} |I(x, y, i) - \mu_I(x, y)|^2} \quad (4.1)$$

where $$\mu_I(x, y) = \frac{1}{N} \sum_{i=1}^{N} I(x, y, i) \quad (4.2)$$

N is the number of frames in the cardiac cycle and in one embodiment N=25. High values of $\sigma_I$ denote high intensity variability throughout the cardiac cycle, which are associated with cardiac movement. Therefore, to find the cardiac ROI the present invention thresholds $\sigma_I$, using k-means++; other techniques such as Otsu, or fuzzy C-means, would also be effective for thresholding. Once the present invention thresholds $\sigma_I$, the present invention defines the cardiac ROI as the bounding box of the largest connected component as illustrated in FIG. 10. For subsequent processing, the pixels that reside cardiac ROI were only analyzed.

FIG. 10 provides a 4CH CMR image at ED (panel a) and ES (panel b). The zoomed cardiac region of interest at ED and ES is shown in panels c and d. The RV anatomical landmarks are annotated in in panels c and d. Landmarks that will be selected by users of the technique are shown as circles in panels c and d.

The second step is the user identification of the ED and ES frames. The ED frame is the frame that qualitatively shows the RV at its largest size. Once selected, the user identifies the following landmarks: the apex, both sides of the TV (i.e., lateral and septal) and the middle of the BP, as shown in FIG. 10, panel c. The apex can be found by selecting the region where the free wall and the septum intersect. The left lateral side of the TV is located in the proximal part of the septum (i.e. where the septum becomes thinner); the right lateral side of the TV is next to the atrial insertion point (i.e., follow the free wall from the apex, and localize the indentation). Standard anatomic landmarks were utilized to identify the TV. The middle of the BP is a point near the center of the RV that has a high intensity (i.e., blood pixel).

The ES frame is the frame that qualitatively shows the RV at its smallest size. There may be multiple frames that qualitatively appear to contain the smallest RV area. In this case, the ES frame is the frame where the midpoint of the TV looks the closest to the apex. Once the ES frame is selected, the user identifies the apex and both sides of the TV (i.e. lateral and septal). Since the TV is closed in the ES frame, the valve is visible in the image, and the TV landmarks are selected from the intersection between the TV line with the free wall (TV lateral landmark) and septum (TV septal landmark). The middle of the BP landmark is not selected in the ES frame because the algorithm propagates the landmark automatically from the ED frame, as indicated below.

For each of the user-selected landmarks, the technique finds the minimum cost trajectory of the specific landmark throughout the cardiac cycle. Although there are multiple shortest path algorithms, in a preferred embodiment dynamic programming may be used, which is modified so that the path intersects each frame at just a single point.

The cost function ($C_f$) that is used for the propagating the BP landmarks is the edge strength of I(x,y,n), which is calculated by using equation (3.2) on each frame. For the other landmarks, ($C_f$) is I because the shortest path will follow a low intensity point throughout the cardiac cycle.

To make sure that the technique selects the landmark as part of the path, the present invention adds a constant value to $C_f$, and the present invention sets the cost to zero at the user-selected landmark locations. The constant value is the maximum of the number of elements of $C_f$ and the maximum value of the array.

For the path to be smooth, the location of the landmark at frame 1 should be adjacent to the location of the landmark at frame N. To add this constraint to the dynamic programming, the present invention extends $C_f$ along the temporal dimension in a periodic fashion from [1, N] to [−N+1,2N]. This extended version is referred to as $C_f^*$.

Given $C_f^*$, the present invention initializes the cumulative sum used in dynamic programming to be $M_f$ (x, y, −N+1)=$C_f^*$(x, y, −N+1) for each x, y. The other $M_f$ values are recursively computed:

$$M_f(x, y, n) = \left[\min_{\Omega} M_f(x_f, y_f, n-1)\right] + C_f^*(x, y, n) \quad (4.3)$$

where $$\Omega = \{(x_f, y_f): |x_f - x| \le d_x, |y_f - y| \le d_y\} \quad (4.4)$$

for each n∈[−N+2,2N] and for each (x,y), where ($d_x$, $d_y$) represent the step size used in the dynamic programming search. For each landmark, the step size ($d_x$, $d_y$) is calculated to be the average landmark displacement per frame:

$$d_x = \frac{|x_{ED} - x_{ES}|}{\tau_{ED,ES}} \quad (4.5)$$

-continued $$d_y = \frac{|y_{ED} - y_{ES}|}{\tau_{ED,ES}} \quad (4.6)$$

where $$\tau_{ED,ES} = \min(|ED - ES|, N - |(ED - ES)|) \quad (4.7)$$

Here $(x_{ED}, y_{ED})$ and $(x_{ES}, y_{ES})$ are the landmark's (x,y) coordinates for the ED and ES frame, respectively. For the middle of the BP, the present invention sets $d_x=d_y=1$ to reduce the amount of movement of the landmark throughout the cardiac cycle.

A path may be denoted as $P=(p_1, \ldots p_{2N})$, where $p_n=(x_n,y_n)$. Once $M_f$ has been generated, the path is initialized as follows:

$$p_{2N} = \underset{x,y}{\operatorname{argmin}} M_f(x, y, 2N) \quad (4.8)$$

The rest of the path is created as follows:

$$p_n = \underset{\Omega^*}{\operatorname{argmin}} M_f(x, y, n) \quad (4.9)$$

where $$\Omega^* = \{(x, y): |x - x_{n+1}| \le d_x, |y - y_{n+1}| \le d_y\} \quad (4.10)$$

The septum is a low-intensity region within the cardiac ROI that separates the RV from the LV. The free wall is also a low-intensity region, so the present invention uses the following technique to ensure that the free wall is not accidentally included as part of the septum. On each frame, the present invention thresholds I(x,y,n) to find the low intensity regions inside the cardiac ROI. Then, the present invention modifies those low intensity regions to exclude any pixels that fall outside an ellipse of the form, $$\frac{(x\cos(\alpha) - y\sin(\alpha) + t_x)^2}{a^2} + \frac{(x\sin(\alpha) + y\cos(\alpha) + t_y)^2}{b^2} = 1 \quad (4.11)$$

where $$a = \frac{\sqrt{(x_{AP} - x_{TV_s})^2 + (y_{AP} - y_{TV_s})^2}}{2} \quad (4.12)$$

$$b = \frac{a}{2} \quad (4.13)$$

$$\alpha = \tan^{-1}\left(\frac{y_{AP} - y_{TV_s}}{x_{AP} - x_{TV_s}}\right) \quad (4.14)$$

$$t_x = \operatorname{round}\left(\frac{x_{AP} + x_{TV_s}}{2}\right) \quad (4.15)$$

$$t_y = \operatorname{round}\left(\frac{y_{AP} + y_{TV_s}}{2}\right) \quad (4.16)$$

Here $(x_{AP}, y_{AP})$ and $(x_{TV_s}, y_{TV_s})$ are the (x,y) coordinates for the apex and the septal part of the TV landmarks, respectively. The present invention assumes a 2:1 aspect ratio for the ellipsoidal fit of the septum region.

Given the propagated landmarks and the septum at each frame, the present invention proceeds to segment the RV throughout the cardiac cycle. The contour that outlines the ventricle is obtained as follows: first the technique constructs an RV ROI; second, it outlines the free wall; third it finds the endocardial border; and fourth it joins the septal and lateral sides of the TV, using a straight line, to form the border corresponding to the TV. The endocardial border is the high gradient region that divides the BP from the septum and goes from the apex to the septal part of the TV. A smoothing operation is performed to ensure a smooth RV contour. A morphological filling operation may be carried out to generate a mask from the contour.

Figure 11:
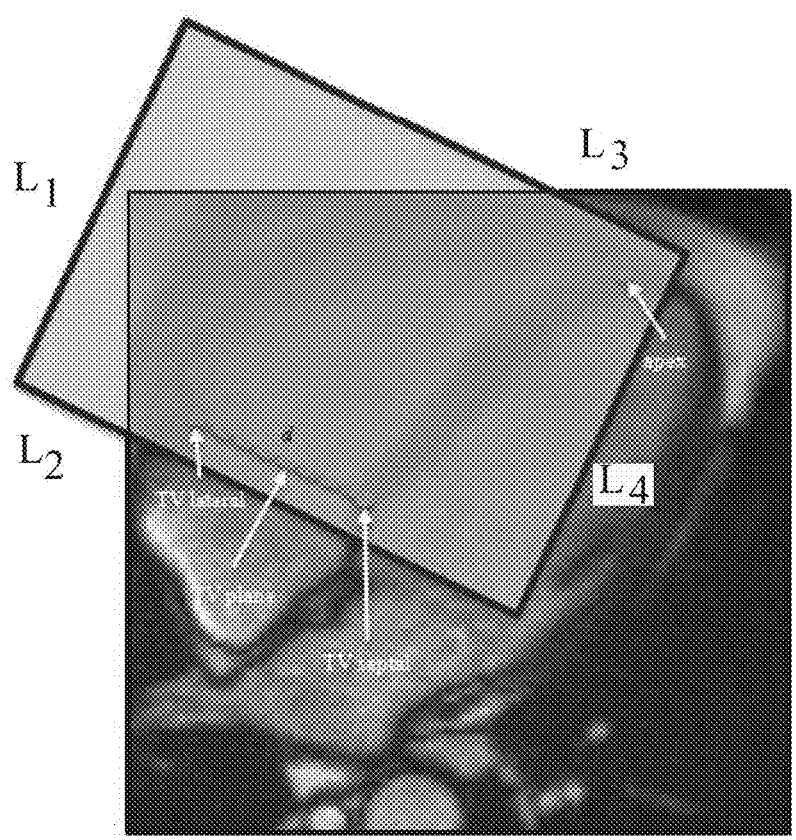
FIG. 11 shows that the RV-ROI is the overlap between the rectangle created by lines L1, L2, L3 and L4 and the cardiac region of interest.

The segmentation procedure begins by finding a sub-region within the cardiac ROI that pertains to the RV-ROI. For the ED frame the RV-ROI is the overlap between the cardiac ROI and the rectangle consisting of lines $L_1$, $L_2$, $L_3$ and $L_4$, shown FIG. 11. Letting d denote the pixel distance between the lateral and septal sides of the TV, construct $L_1$ as a line perpendicular to the TV positioned d pixels right lateral from the lateral side of the TV. Construct lines $L_2$ and $L_3$ parallel to the TV positioned d/5 pixels proximal from the TV and distally from the apex, respectively. Finally, construct $L_4$ as a line perpendicular to the TV positioned d/5 pixels left lateral from the apex. For subsequent frames, the ROI is formed by taking the final, semi-automated RV mask in the ED frame and applying morphological dilation using a 3×3 square operator. The pixel locations that fall outside the ROI but inside the cardiac ROI will be given a fixed cost function value in the subsequent steps of the segmentation procedure.

The contrast between the trabeculae and the BP is greater than the contrast between the trabeculae and the free wall. This is why active contour algorithms that rely on gradient strength to achieve a minimum cost spline will latch onto the trabeculae/blood pool boundary rather than the free wall. Since the free wall has lower mean signal intensity than the trabeculae, minimum shortest path techniques are used for this task.

The present invention compares three different techniques for outlining the free wall: Dijkstra's shortest-path algorithm, Strandmark's ALCT algorithm and a modified version of the algorithm described above. I(x,y,n) may be used as the primary component for the cost function. To restrain the minimum cost path from going into the septum, the present invention sets all the pixels in the septum to have the highest value in the cost function for the given frame. Unlike Dijkstra's algorithm, which uses no parameters, ALCT uses an A* algorithm that incorporates length, curvature and torsion penalties in an active contour model to find the minimum cost path.

The PDP algorithm of an embodiment of the present invention finds a segmentation mask by finding a path using polar coordinates. The technique used for finding the path is dynamic programming. The inputs to the algorithm are the intensity image I(x,y,n), and the gradient strength G(x,y,n) defined by (3.1) or (3.2). To ensure that the free wall does not latch onto the trabeculae/BP boundary the present invention replaces G(x,y,n) with $$G(x, y, n) = \max_{x,y} I(x, y, n) - I(x, y, n) \quad (4.17)$$

This new definition of the gradient strength will give high values to the free wall, allowing the PDP to latch to the free wall. Given I(x,y,n) and G(x,y,n), the present invention creates the cost function using equations (3.3)-(3.9). The origin used in eqs (3.3) and (3.4) is the middle of the BP landmark.

To incorporate the landmarks into this cost function, the present invention sets the cost to zero at the polar coordinates associated with the lateral portion of the TV and the apex for a given frame and adds a constant value to the other cost function values in a given frame (n). The constant value is set to the number of elements in the $C(\theta, \rho, n)$ array. Given the $C(\theta, \rho, n)$ array the present invention find the closed contour using the technique outlined above. The algorithm described above generates a closed contour that may include regions that are proximal to the TV or overlap with the septum. Any part of the segmentation mask that is proximal to the TV or if the septum is removed.

Given the free wall, the technique proceeds to find the septum-BP border. For each frame, the present invention calculates the cost function by first calculating the edge strength as defined by (3.2). Next, the present invention subtracts the edge strength from the maximum edge strength. Given this cost function, the septum-BP border is the minimum cost path from the apex to the septal portion of the TV. To find the septum-BP border, the present invention uses Dijkstra's shortest-path algorithm.

Given the semi-automated segmentation of the RV in 4CH cardiac images, embodiments of the present invention may smooth the segmentation by applying a 1D median filter in the temporal dimension. For all patients, a filter size of 5 was used. The median filter in the temporal dimension is implemented as follows: for each (x,y) coordinate, look at its 2 nearby neighbors in the temporal dimension. Apply a median filter to those binary values. The present invention keeps the constraint in the previous section that removes every pixel that is proximal to the TV. The temporal smoothness will remove outlying traces at the expense of reducing metrics such as fractional area change.

As shown in FIG. 10, panels c and d, the RV is composed of the trabeculae and the BP. The impact of including the trabeculae in SAX CMR views is assumed to be small in healthy individuals; no such analysis has been done for 4CH views. An advantage of the proposed technique is that it can automatically exclude trabeculae from the semi-automated segmentation of the RV if needed. The BP is defined as the largest connected component inside the semi-automated segmentation of the RV that has an intensity value higher than a threshold. To find the threshold, the present invention first calculates the histogram of I(x,y,n) at the locations of the septum and the RV, respectively and compares the frequency for each intensity bin. The threshold is the highest intensity bin where the frequency of the septum is higher than the frequency of the RV.

To improve the reproducibility of the RV segmentation in 4CH and SAX CMR images, the RV trabeculae may be included within the BP volume to improve reproducibility. A second recommendation is to draw a smooth endocardial border.

To evaluate the segmentation performance, the present invention analyzed 175 images coming from 7 different patients (25 frames per patient). Manual tracing was performed two radiologists and a cardiologist, each with at least 5 years of training and experience in the interpretation of CMR images. To allow for human variability and biases in the manual tracing, each tracer was blinded to the others' work.

Images were acquired in a Siemens 1.5T Aera scanner, using a cine steady-state free-precession pulse sequence (TR=2.7-2.8 ms, TE=1.16 ms, acq. matrix=168×192, FOV=29.8×34 cm; slice thickness=6 mm) and a phased array flex body coil. The performance metrics used for analysis are the Dice Metric, FAC and the correlation coefficient (R). The latter measures the closeness of data points to a regression line of the form y=mx+b, and is defined as $$R = \frac{\sum_{i=1}^{N}(x_i - \bar{x})(y_i - \bar{y})}{\sqrt{\left[\sum_{i=1}^{N}(x_i - \bar{x})^2\right]\left[\sum_{i=1}^{N}(y_i - \bar{y})^2\right]}} \quad (4.18)$$

where $$\bar{x} = \frac{1}{N}\sum_{i=1}^{N} x_i \quad (4.19)$$

and $$\bar{y} = \frac{1}{N}\sum_{i=1}^{N} y_i \quad (4.20)$$

Here x and y represent two samples N=7. The sign of R will be the same as the sign of the slope (m) of the regression line. Values of R close to one indicate a strong positive linear relationship between the variables (x,y). Values of R close to zero indicate x and y are independent.

To achieve the best performance, the algorithm-specific parameters that yield the highest mean Dice metric were used. To reduce bias, the traces the present invention used for optimizing the algorithm-specific parameters were not used for the subsequent experiments. The PDP as defined above has 5 major parameters $\gamma, \Delta\rho, \Delta\theta, \alpha, \beta$. The present invention sets the smoothing parameter ($\gamma$) to 5°, the radial sampling interval ($\Delta\rho$) to 0.5 pixels and sets the parameter that measures the importance of the gradient strength ($\beta$) to be dependent on the importance of the polar variance image ($\alpha$) by the equation $\beta=1-\alpha$. The range of $\alpha$ was from 0.3 to 0.6 in 0.1 increments. The range of angular sampling interval ($\Delta\theta$) was from 0.4 to 1.1 in 0.1 increments. The algorithm-specific parameters of $\alpha=0.4$ and $\Delta\theta=0.8$ yielded the highest mean Dice.

ALCT identifies 3 major parameters $\rho$, $\sigma$, v. A high torsion regularization (v) forces the curve to stay within a plane and, as result of working with 2D images, the present invention sets v=0. For finding the optimum curvature regularization ($\sigma$), the present invention sets the length regularization to zero ($\rho=0$), and varies a from $10^{-4}$ to $10^4$ in $10^{0.1}$ increments. Given the optimum $\sigma$, the present invention varies the length regularization from 0 to 1 in 0.025 increments. The algorithm-specific parameters of $\sigma=10^{2.6}$ and $\rho=0.35$ yielded the highest mean Dice.

Table 4.1 shows the results of the Dice analysis (mean and standard deviation based on a total of 175 images) between the physicians. The percent overlap between the traces (which is in the mid to high 80s) reflects the variability between the physicians and serves as a reference for evaluating the performance of the semi-automated algorithms.

TABLE 4.1

Inter-physician manual tracing performance. This table shows the overlap between different trained physicians using the tracing protocol (described in the manual tracing protocol section) to manually trace the 4CH RV throughout the cardiac cycle.

| | Manual Tracing | | |
|---|---|---|---|
| Manual Tracing | Physician1 $\mu \pm \sigma$ | Physician2 $\mu \pm \sigma$ | Physician3 $\mu \pm \sigma$ |
| Physician1 | — | 0.8707 ± 0.0561 | 0.8592 ± 0.0526 |
| Physician2 | 0.8707 ± 0.0561 | — | 0.8562 ± 0.0544 |
| Physician3 | 0.8592 ± 0.0526 | 0.8562 ± 0.0544 | — |

Table 4.2 shows the results of the Dice between the semi-automated algorithms and the physicians' manual traces. This metric gives insight as to which free wall outlining algorithm (PDP, ALCT or Dijkstra) provided a better match with the physicians' traces. The first column of Table 4.2 shows which physician selected the landmarks, each physician selected 7 landmarks per patient. The second column shows whether the mask used to calculate the Dice is the RV (BP+trabeculae) or the BP. The third column of Table 4.2 denotes the algorithm used for outlining the free wall. Note that although all Dice values are within physician variability, the PDP of the present invention consistently outperforms the ALCT and Dijkstra algorithms. When comparing the mutual overlap between the physicians' manual traces and the RV or BP semi-automated masks, it is shown that physician 1 has a better overlap with the RV; meanwhile physicians' 2 and 3 have a higher Dice with the BP. This means that the traces from physician 1 included more trabeculae, while physicians 2 and 3 tended to exclude more trabeculae.

TABLE 4.2

Comparing physician manual tracing to semi-automated tracing (RV and BP) using physician landmarks.

| | | | Manual Tracing | | |
|---|---|---|---|---|---|
| Landmark Selection | Segmentation | Free Wall | Physician1 $\mu \pm \sigma$ | Physician2 $\mu \pm \sigma$ | Physician3 $\mu \pm \sigma$ |
| Physician1 | RV | PDP | 0.8970 ± 0.0418 | 0.8639 ± 0.0723 | 0.8413 ± 0.0580 |
| | | ALCT | 0.8912 ± 0.0493 | 0.8691 ± 0.0667 | 0.8465 ± 0.0589 |
| | | Dijkstra | 0.8879 ± 0.0392 | 0.8657 ± 0.0629 | 0.8418 ± 0.0554 |
| | BP | PDP | 0.8614 ± 0.0549 | 0.8835 ± 0.0463 | 0.8690 ± 0.0477 |
| | | ALCT | 0.8475 ± 0.0636 | 0.8784 ± 0.0533 | 0.8616 ± 0.0596 |
| | | Dijkstra | 0.8516 ± 0.0527 | 0.8790 ± 0.0442 | 0.8626 ± 0.0507 |
| Physician2 | RV | PDP | 0.8953 ± 0.0434 | 0.8676 ± 0.0717 | 0.8335 ± 0.0601 |
| | | ALCT | 0.8884 ± 0.0539 | 0.8712 ± 0.0711 | 0.8372 ± 0.0632 |
| | | Dijkstra | 0.8777 ± 0.0496 | 0.8613 ± 0.0701 | 0.8254 ± 0.0615 |
| | BP | PDP | 0.8638 ± 0.0543 | 0.8874 ± 0.0452 | 0.8623 ± 0.0469 |
| | | ALCT | 0.8508 ± 0.0658 | 0.8810 ± 0.0562 | 0.8554 ± 0.0592 |
| | | Dijkstra | 0.8499 ± 0.0599 | 0.8778 ± 0.0523 | 0.8529 ± 0.0542 |
| Physician3 | RV | PDP | 0.8969 ± 0.0410 | 0.8699 ± 0.0706 | 0.8372 ± 0.0514 |
| | | ALCT | 0.8860 ± 0.0577 | 0.8691 ± 0.0711 | 0.8378 ± 0.0606 |
| | | Dijkstra | 0.8880 ± 0.0444 | 0.8706 ± 0.0671 | 0.8363 ± 0.0542 |
| | BP | PDP | 0.8615 ± 0.0536 | 0.8872 ± 0.0452 | 0.8628 ± 0.0423 |
| | | ALCT | 0.8451 ± 0.0683 | 0.8772 ± 0.0584 | 0.8526 ± 0.0635 |
| | | Dijkstra | 0.8559 ± 0.0547 | 0.8848 ± 0.0464 | 0.8592 ± 0.0488 |

The next step was to measure the robustness of the different free wall outlining techniques to landmark selection. Table 4.3a shows the Dice when looking only at the RV semi-automated masks; Table 4.3b shows the Dice when looking only at the BP semi-automated masks. Note that although the Dice values are in the mid to high 90s, the PDP of the present invention consistently outperforms the ALCT and Dijkstra algorithms.

TABLE 4.3

Inter-physician performance using semi-automated techniques to do the tracing. The tables calculate the mutual overlap when comparing (a) semi-automated RV masks and (b) semi-automated blood pool (BP) masks.

| | | Landmark Selection | | |
|---|---|---|---|---|
| Landmark Selection | Free Wall | Physician1 $\mu \pm \sigma$ | Physician2 $\mu \pm \sigma$ | Physician3 $\mu \pm \sigma$ |
| | | a | | |
| Physician1 | PDP | — | 0.9629 ± 0.0212 | 0.9661 ± 0.0218 |
| | ALCT | — | 0.9569 ± 0.0396 | 0.9636 ± 0.0346 |
| | Dijkstra | — | 0.9488 ± 0.0315 | 0.9627 ± 0.0261 |
| Physician2 | PDP | 0.9629 ± 0.0212 | — | 0.9670 ± 0.0244 |
| | ALCT | 0.9569 ± 0.0396 | — | 0.9633 ± 0.0355 |
| | Dijkstra | 0.9488 ± 0.0315 | — | 0.9595 ± 0.0303 |
| Physician3 | PDP | 0.9661 ± 0.0218 | 0.9670 ± 0.0244 | — |
| | ALCT | 0.9636 ± 0.0346 | 0.9633 ± 0.0355 | — |
| | Dijkstra | 0.9627 ± 0.0261 | 0.9595 ± 0.0330 | — |
| | | b | | |
| Physician1 | PDP | — | 0.9674 ± 0.0190 | 0.9704 ± 0.0235 |
| | ALCT | — | 0.9605 ± 0.0375 | 0.9653 ± 0.0342 |
| | Dijkstra | — | 0.9531 ± 0.0300 | 0.9624 ± 0.0271 |
| Physician2 | PDP | 0.9674 ± 0.0190 | — | 0.9708 ± 0.0261 |
| | ALCT | 0.9605 ± 0.0375 | — | 0.9665 ± 0.0362 |
| | Dijkstra | 0.9531 ± 0.0300 | — | 0.9635 ± 0.0338 |
| Physician3 | PDP | 0.9704 ± 0.0235 | 0.9708 ± 0.0261 | — |
| | ALCT | 0.9653 ± 0.0342 | 0.9665 ± 0.0362 | — |
| | Dijkstra | 0.9624 ± 0.0271 | 0.9635 ± 0.0338 | — |

PDP, Polar Dynamic Programming; ALCT, a* Using Length, Curvature, and Torsion Penalties.

In Table 4.2, it was shown that the semi-automatic techniques generated Dice values that were within human variability. Therefore, it was desirable to see if this translates to similar FAC values. The FAC analysis for Table 4.4 and 4.5 was done using the semi-automated segmentation masks generated by the PDP free wall technique. Table 4.4 shows the mean FAC and standard deviation of the three manual traces, the RV, and BP FAC values. The results show that the RV and BP FAC have lower standard deviation than the FAC derived from manual tracers. In general, the FAC calculated from the BP is similar to the average manual traces; this is expected since 2 out of the 3 tracers excluded the trabeculae region as part of the RV. The BP FAC is generally higher than the RV FAC. This is because in the ES frame a large percent of the RV is trabeculae and when excluded, the area in the ES frame is lower, resulting in a higher FAC.

related cardiovascular disorders. However, over the years most of the attention has been on the LV, in part due to the lack of optimal imaging tools for looking at the RV. With the advent of CMR, it is now possible to quantify the function of both the LV and RV providing new capabilities related to

TABLE 4.4

Comparison of FAC derived from three different measurements; manual traces, RV and BP.

| Segmentation | Free Wall | Patient | | | | | | |
|---|---|---|---|---|---|---|---|---|
| | | 1 $\mu \pm \sigma$ | 2 $\mu \pm \sigma$ | 3 $\mu \pm \sigma$ | 4 $\mu \pm \sigma$ | 5 $\mu \pm \sigma$ | 6 $\mu \pm \sigma$ | 7 $\mu \pm \sigma$ |
| Manual Trace | — | 0.4977 ± 0.0474 | 0.4823 ± 0.0459 | 0.5105 ± 0.0520 | 0.2655 ± 0.0143 | 0.5435 ± 0.0192 | 0.4365 ± 0.0574 | 0.5269 ± 0.0848 |
| RV | PDP | 0.4143 ± 0.0134 | 0.3622 ± 0.0251 | 0.3706 ± 0.0268 | 0.2152 ± 0.0103 | 0.4485 ± 0.0100 | 0.2470 ± 0.0445 | 0.3303 ± 0.0277 |
| BP | PDP | 0.4943 ± 0.0079 | 0.4424 ± 0.0150 | 0.5207 ± 0.0221 | 0.2394 ± 0.0133 | 0.5195 ± 0.0083 | 0.3107 ± 0.0324 | 0.5355 ± 0.0251 |

R and confidence intervals were used from FAC measurements to measure the linear relationship and determine whether the relationship is statistically significant. The statistical analysis was performed comparing the inter-physicians' FAC variance (Table 4.5a), the semi-automated segmentation focusing on BP FAC with the physicians' FAC based on their manual tracing (Table 4.5b), and the semi-automated segmentation focusing on BP FAC among themselves (Table 4.5c). Table 4.5a shows that the correlation coefficients range from 0.9377 to 0.7364 and only the FAC between physicians 1 and 2 turns out to have a p value >0.05. Table 4.5b shows that the correlation coefficients range from 0.7886 to 0.9238 with p values <0.05. Finally, Table 4.5c shows the overlap between the semi-automated technique using different physicians' landmarks. Note that all the R values are higher than 0.95 and their respective p values <0.01.

TABLE 4.5

R score and P value using FAC. (a) Inter-physician manual tracing performance, (b) physician manual tracing to semi-automated tracing (RV and BP) using physician landmarks, and (c) inter-physician performance using the semi-automated technique to do the tracing.

| | Manual Outlining | | |
|---|---|---|---|
| Manual Outlining | Physician1 R | Physician2 R | Physician3 R |
| a | | | |
| Physician1 | — | 0.7364* | 0.9377★ |
| Physician2 | 0.7364* | — | 0.7809+ |
| Physician3 | 0.9377★ | 0.7809+ | — |
| b | | | |
| Physician1 | 0.8382+ | 0.8321+ | 0.8143+ |
| Physician2 | 0.9238★ | 0.8225+ | 0.9114★ |
| Physician3 | 0.8692+ | 0.7886+ | 0.8680+ |
| c | | | |
| Physician1 | — | 0.9745✓ | 0.9740✓ |
| Physician2 | 0.9745✓ | — | 0.9843✓ |
| Physician3 | 0.9740✓ | 0.9843✓ | — |

*p-value < 0.1,
+p-value < 0.05,
★p-value < 0.01,
✓p-value < 0.001.

Understanding the functional properties of the cardiac chambers is important for diagnosing both LV and RV the latter. Most of the analysis tools available in the clinic are still focused on the LV. The algorithm presented above was developed to provide an easy-to-use tool for the functional analysis of the RV. The algorithm was designed to segment the RV in 4CH views with the option to include or exclude the trabeculae to accommodate for different methods for RV functional analysis.

The results described previously show that the embodiments of the present invention yield results that are within human variability (Table 4.2), while also being robust to physicians' landmarks (Table 4.3). Using as measurement Dice, PDP of the present invention outperformed Dijkstra and ALCT in the delineation of the free wall. When the analysis turned to a more clinical measure, FAC BP yielded results similar to the physicians' traces (Table 4.4, Table 4.5b) because two out of the three tracers excluded the trabeculae from the RV trace. The present invention also shows that FACs are robust to the physicians' landmarks (Table 4.5c).

Figure 12:
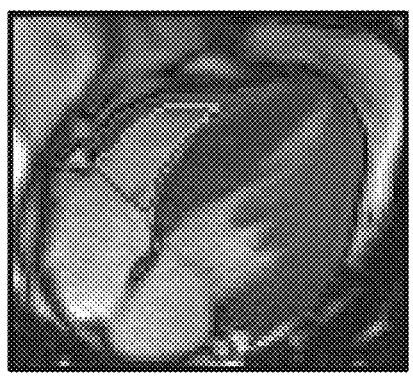
FIG. 12 illustrates ES physicians' traces. Trace from physician 1 500 includes most of the trabeculae, while the other trace 501 excludes most of the trabeculae.

One of the main reasons for the discrepancy between the manual outlines (Table 4.1) is the trabeculae. For instance, if the Dice metric is calculated only on the ED frame, the values are in the low 90s. The Dice metric calculated throughout the cardiac cycle yields values in the mid to high 80s; thus the increase in variability stems from trabeculae found in the systolic portion of the cardiac cycle. The increase in variability stems from trabeculae found in the ES frame. An example of the outline variation can be seen in FIG. 12. One of the physicians (line 500) included almost no trabeculae while another physician (line 501) included most of the trabeculae. These discrepancies lead to the high variability seen throughout the study (i.e., Table 4.1, Table 4.4 and Table 4.5a).

Figure 13A:
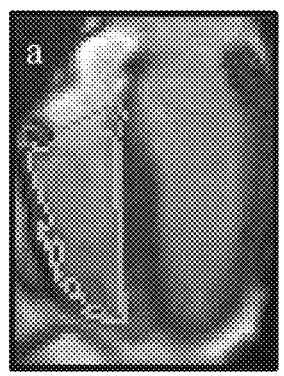
FIG. 13A shows BP FAC for different user-selected landmarks in the ED frame.
Figure 13B:
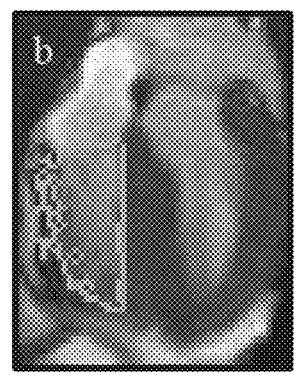
FIG. 13B shows BP FAC for different user-selected landmarks in the ES frame.

Looking at Table 4.4 it may be seen that the patients who have mean BP FAC outside a standard deviation of the mean manual traces FAC are patients 2 and 6. The main problem with patient 2 was the selection of the ES frame. The area from the manual outlines consistently identifies frame 13 as the ES frame, whereas the physicians visually identified the ES frame in the 9-10 range. When the error between the selected ES frame and the real ES frame is more than 2 frames, the performance, as measured by FAC will suffer. Patient 6 shows the importance of selecting the correct landmark locations. The difference in FAC for this patient can be attributed to the landmark selection, in this particular case, the location of the septal portion of the TV, shown in FIG. 13. An incorrect landmark selection may affect the area of the ventricle in the ED or ES frame and consequently affect the final FAC value. As shown in FIGS. 13A and 13B show BP FAC for different user-selected landmarks in the ED (FIG. 13A) and ES frame (FIG. 13B). The outline in green yielded the highest BP FAC, while the outline in cyan yielded the lowest BP FAC.

Another important aspect of this proposed technique is the time component. The proposed method using PDP for outlining the free wall, took on average 2 minutes per patient, while manual tracing took the physicians approximately 15 minutes per patient.

The present invention uses an algorithm based on landmark selection and an PDP for the semi-automatic segmentation of the RV in 4CH cine CMR images. The results show that the proposed technique matches the physicians' manual traces and reduces variability among tracers. The results indicated that the algorithm can optimize the workflow associated with the analysis of the RV by reducing the time required for the RV segmentation. The present invention showed that BP FAC matches the results derived from the manual tracers. This can provide a useful tool for assessing RV functional evaluation.

Figure 14:
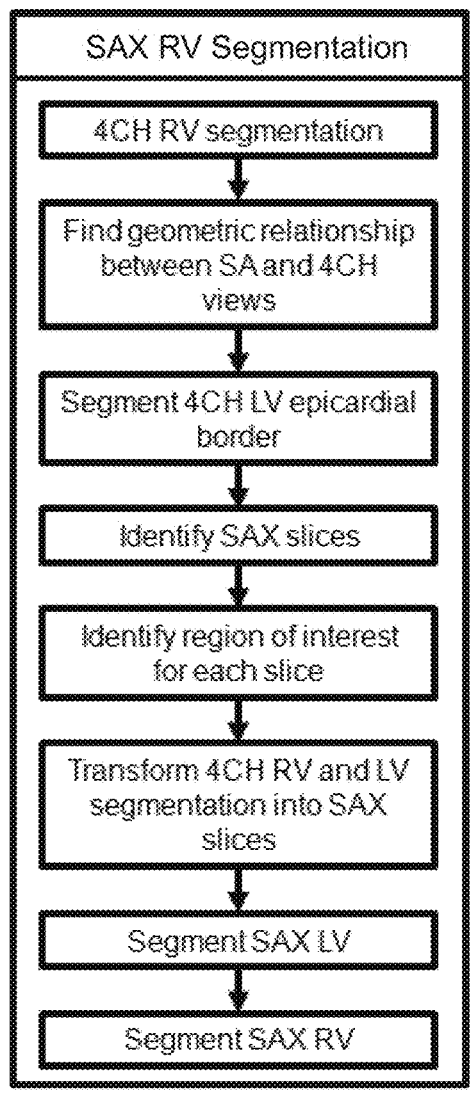
FIG. 14 provides a SAX RV segmentation flowchart.

In yet other embodiments, the present invention provides a technique that consists of the following steps: (1) 4CH semi-automatic segmentation of the RV; (2) geometric relationship between SAX and 4CH views; (3) 4CH segmentation of the LV; (4) identification of the SAX slices as basal, mid-ventricular or apical; (5) automatic identification of the ROI for each slice; (6) transformation of the 4CH RV and LV masks into the SAX view; (7) segmentation of the LV using and (8) segmentation of the RV. These steps are outlined in FIG. 14.

2D MR images typically have headers that position them within the patient coordinate system (PCS). These headers contain:
1. Image position ($P_{xyz}$): location in 3D space of the first transmitted pixel.
2. Pixel spacing ($\Delta x$, $\Delta y$): a vector containing the physical distance between adjacent vertical and horizontal pixels. The distance is measured in millimeters.
3. Image orientation ($X_{xyz}$, $Y_{xyz}$): the direction cosines of the first row and column with respect to the patient.
4. Slice thickness ($\Delta s$): nominal slice thickness. The thickness is measured in millimeters.

Given the above information, the present invention creates a rotation matrix ($M_{rot}$) that rotates the 2D image from the image plane to PCS.

$$M_{rot} = \begin{bmatrix} X_x \Delta x & Y_x \Delta y & 0 & P_x \\ X_y \Delta x & Y_y \Delta y & 0 & P_y \\ X_z \Delta x & Y_z \Delta y & 0 & P_z \\ 0 & 0 & 0 & 1 \end{bmatrix} \quad (5.1)$$

To make $M_{rot}$ invertible the present invention fills the third column with:

$$Z_{xyz} = X_{xyz} \times Y_{xyz} \quad (5.2)$$

where x is the cross product. This makes (5.1) become:

$$M_{rot} = \begin{bmatrix} X_x \Delta x & Y_x \Delta y & Z_x \Delta s & P_x \\ X_y \Delta x & Y_y \Delta y & Z_y \Delta s & P_y \\ X_z \Delta x & Y_z \Delta y & Z_z \Delta s & P_z \\ 0 & 0 & 0 & 1 \end{bmatrix} \quad (5.3)$$

Defining $M_{rot}^{4CH}$ as the rotation matrix that takes the data from the 4CH image plane and rotates it to the PCS, and $M_{rot}^{SA}$ the rotation matrix that takes the data from the SAX image plane and rotates it to the PCS. Using right hand side matrix multiplication, the present invention can define the rotations matrices that go from the SAX view to the 4CH view as $$M_{SA-4CH} = (M_{rot}^{4CH})^{-1} M_{rot}^{SA} \quad (5.4)$$

inversely to go from the 4CH view to the SAX view just invert (5.4).

Figure 15:
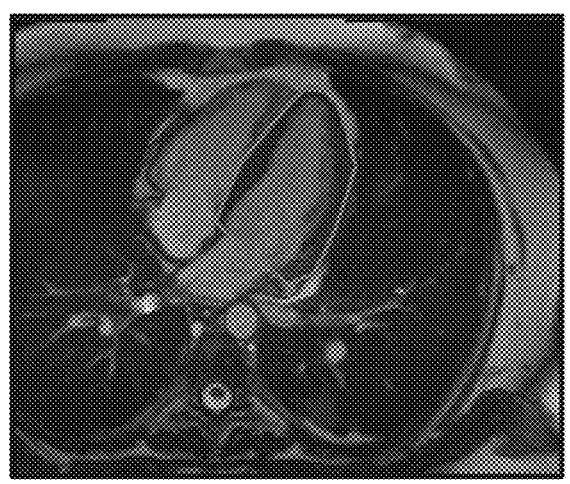
FIG. 15 illustrates the LV epicardial border.

The epicardial border of the LV in 4CH view is shown in FIG. 15. Note that inside the epicardial border 1000 there are bright pixels (corresponding to the BP of the LV) and pixels with similar intensity to the trabeculae in the RV. To find LV epicardial border, the present invention looks for intensities that are similar to those of the RV (both BP or trabeculae) and are left lateral to the RV.

Even if the thresholding technique includes regions that are not part of the epicardial border, the results will be fine-tuned in the "segment SAX LV" section.

Figure 16:
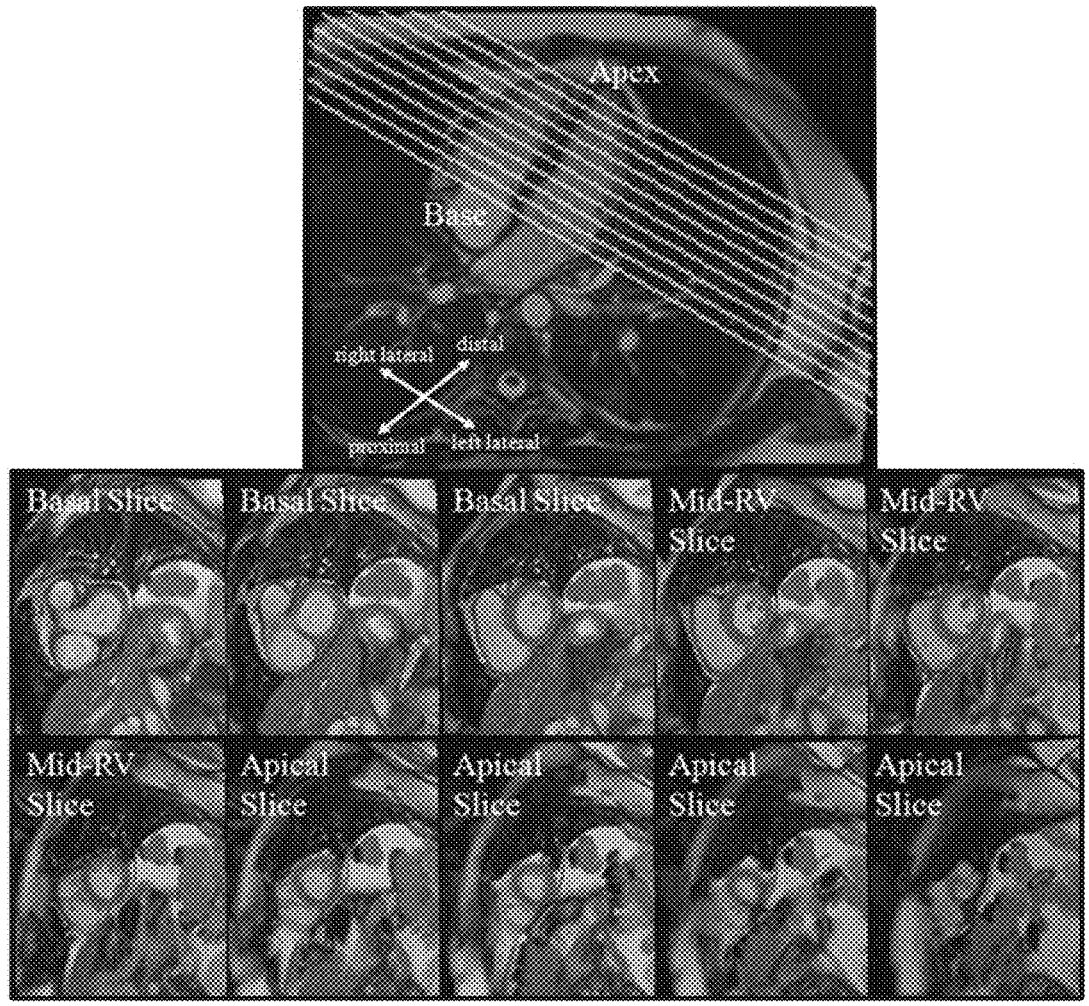
FIG. 16 depicts how the SAX slices that overlap with the 4CH RV segmentation.

Consider the array containing the SAX slices as I(x, y, z, n), where n is the frame number (x,y) are the coordinates within the given frame and z is the SAX slice. There is a need to identify the SAX slices as different parts of the RV have different properties (e.g., RV being divided in two regions at the basal slices). The first step is to take the SAX slices and transform them to the 4CH view. This is done using (5.4). The SAX slices that overlap with the 4CH RV segmentation are shown in FIG. 16, and may be will be categorized into three classes: basal, mid-RV and apical slices. Going from proximal to distal, the most proximal third of the slices will be classified as the basal slices; the next third will be classified as mid-RV slices. Finally, the rest of the slices may be the classified as apical slices. The SAX views are shown from the base (upper left from the SAX stacks) all the way to the apex (lower right from the SAX stacks). The lines show SAX slices that overlap with 4CH view.

Figure 17:
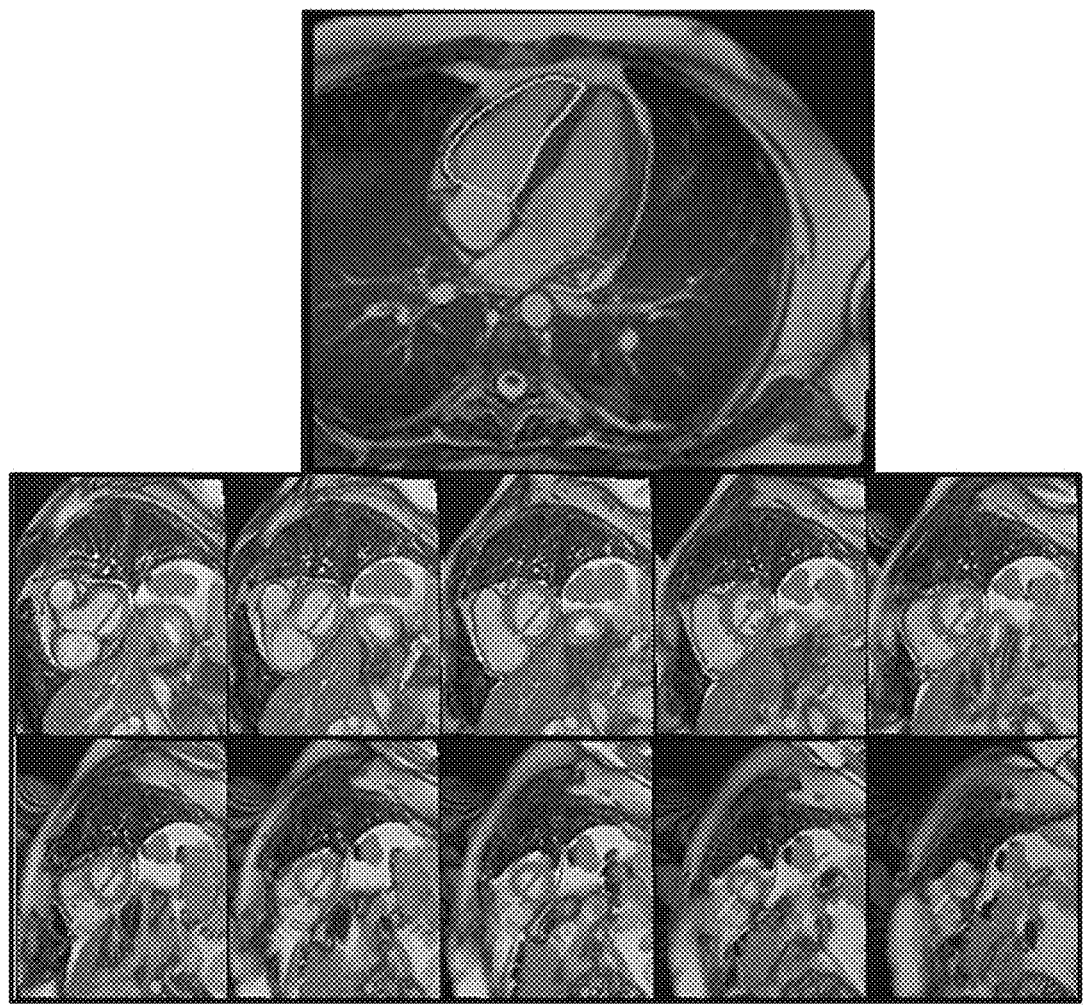
FIG. 17 depicts 4CH RV (cyan) and LV segmentation (magenta) rotated into SAX slices. Lines in SAX slices have been dilated for viewing purposes.
Figure 18A:
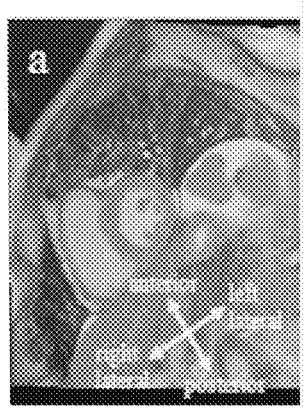
FIGS. 18A-18F illustrate grayscale and polar variance identifying SAX ROI.
Figure 18B:
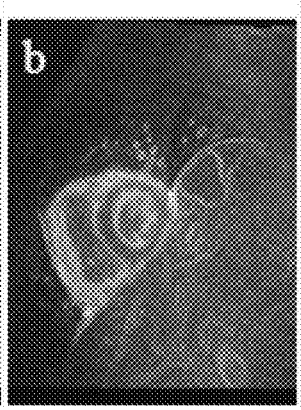
Figure 18C:
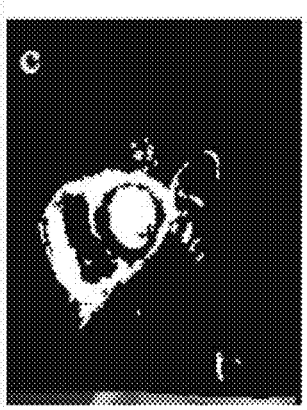
Figure 18D:
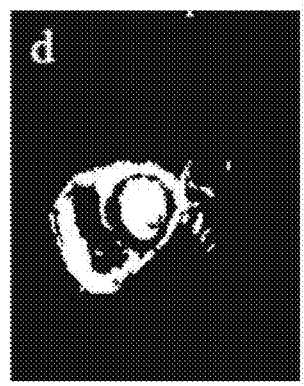
Figure 18E:
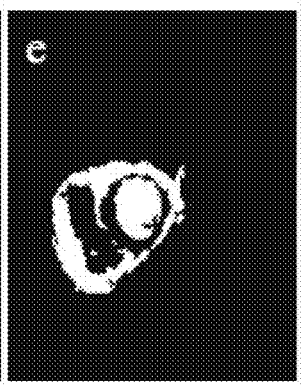
Figure 18F:
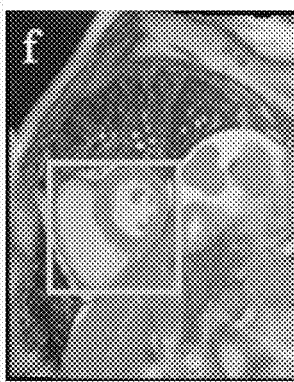
Figure 19A:
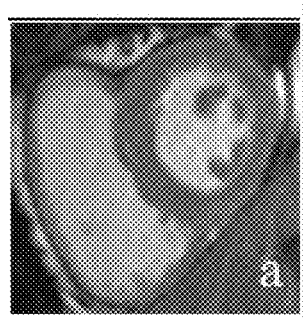
FIGS. 19A, 19B, 19C, 19D and 19E shows segmentation of LV endocardial border.
Figure 19B:
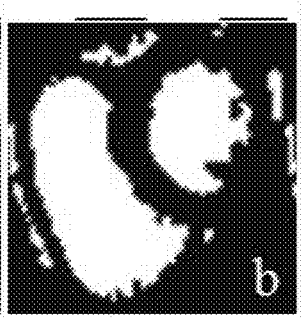
Figure 19C:
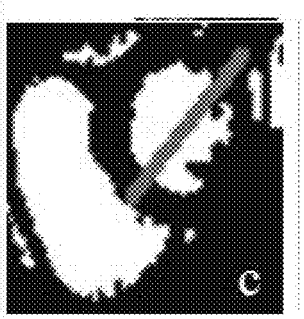
Figure 19D:
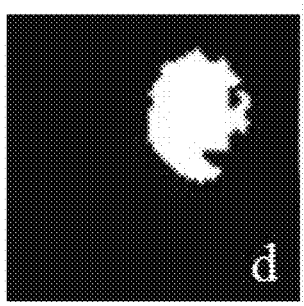
Figure 19E:
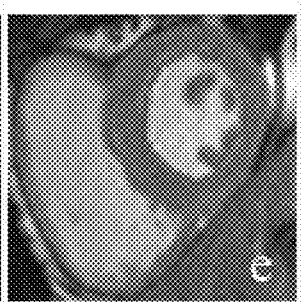

Aside from the general classification of the slices, the present invention also needs a representation slice. This representative slice is used to generate the RV model that will be used throughout the SAX RV segmentation process. The RV representative slice selected is the most proximal mid-RV slice. The present invention uses this slice because it is not part of the basal region, has an area comparable to the basal slices, and contains fewer trabeculations than the apical slices. To transform 4CH RV and LV segmentation masks to the SAX view, the present invention uses the inverse of (5.4). This technique helps reduce the ROI by giving a rough estimate of the LV and RV in SAX views. An example is shown in FIG. 17.

To automatically identify the ROI within each slice, an algorithm of the present invention looks for high standard deviation of pixel intensities throughout the cardiac cycle. The standard deviation image is calculated using (4.1). To get an initial binary mask (m(x,y)), the standard deviation image is thresholded using k-means++. Given an initial mask, the present invention calculates the vertical profile as $$h(y) = \int m(x,y) dx \quad (5.5)$$

Given the vertical profile, the technique looks for the peak value ($\tau_{vert}$). Then it thresholds h(y) to find values bigger than $0.1\tau_{vert}$. The row-wise extension of the ROI ($y_{max}, y_{min}$) is the largest connected component of the thresholded h(y).

$$h(x) = \int_{y_{min}}^{y_{max}} m(x, y)dy \qquad (5.6)$$

Given the horizontal profile, the technique looks for the peak value ($\tau_{horz}$). Then it thresholds h(x) to find values bigger than $0.1\tau_{horz}$. The technique will keep all connected components with an area bigger than 25 percent of the area of the largest connected component. The 25 percent threshold is used because in some cases the binary mask associated with the motion of the free wall is not connected to the binary mask associated with the motion of the myocardium. The column-wise extension of the ROI ($x_{max}$, $x_{min}$) are the minimum and maximum column of the connected components.

FIG. 18, panels (a)-(f), identify the SAX ROI. Panel (a) n image in SAX view; (b) standard deviation image for the given slice; (c) thresholded standard deviation image; (d) ROI reduction using horizontal profiling; (e) ROI reduction using vertical profiling and (f) final ROI used for LV and RV segmentation.

To segment the SAX LV endocardium border, the present invention first identifies BP regions in the SAX slice. For the representative slice, this is done by clustering the image using k-means++ with k=3 where the BP and fat pixels contain the highest mean intensity. The pixels with the lowest mean intensity are associated with air, either from the lungs or outside the patient. For the other slices, the present invention uses the statistics calculated from the LV endocardial border in the representative slice to identify BP regions.

FIG. 19 shows segmentation of LV endocardial border. Panel (a) cropped SAX view of representative slice; (b) BP regions; (c) 4CH epicardial border of LV on SAX view; (d) LV BP region and (e) LV endocardial border. The BP regions (shown in FIG. 19, panel a) associated with the LV endocardium are those which are adjacent to the 4CH LV segmentation rotated into the SAX view (angled line) in FIG. 19, panel c).

Specifically, let's define $l_{LV}$ and ($x_{LV}$, $y_{LV}$) as the length and centroid of the 4CH LV segmentation rotated into the SAX view respectively. Any BP region whose centroid is closer than $l_{LV}/4$ to ($x_{LV}$, $y_{LV}$) will be associated with the LV endocardium (FIG. 19, panel d). These regions are joined by applying a convex hull similar to FIG. 19, panel e. Any pixel whose intensity is larger than the $99^{th}$ percentile of the LV endocardial border pixels, is identified as a fat pixel.

Given the endocardial border of the LV, the present invention outlines the epicardial border using PDP. The origin used for segmenting the SAX LV epicardial border is the centroid of the BP regions associated with the SAX LV endocardial, and the cost function is based on the edge strength of I(x, y, z, n) with a few modifications. For example, it is known that there is a high gradient region just outside of the epicardium therefore any edge strength adjacent to the epicardium region will be set to 0. It is also known that the epicardial border should not include BP regions not associated with the LV endocardial border (e.g., SAX LV BP), therefore BP regions outside the endocardial border will be given a high cost value (i.e. a fake gradient). It is also known that the endocardial border should not include any air pixels; therefore, a high cost value will be given to air pixels (i.e., lowest intensity cluster in the image) as well. With these modifications the present invention runs PDP as defined above. Note that since LV is a circular object, the present invention does not look for convex regions and sets the algorithm-specific parameters as follows: $\Delta\theta=3°$, $\alpha=0.8$, $\beta=0.2$.

Figures 20A, 20B:
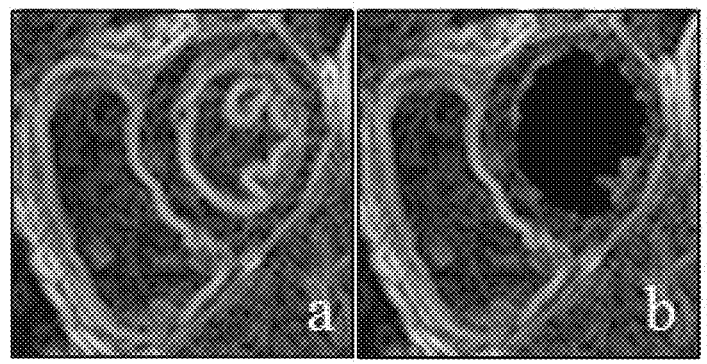
FIGS. 20A, 20B, 20C, and 20D show a change of cost function for an embodiment of the present invention.
Figures 20C, 20D:
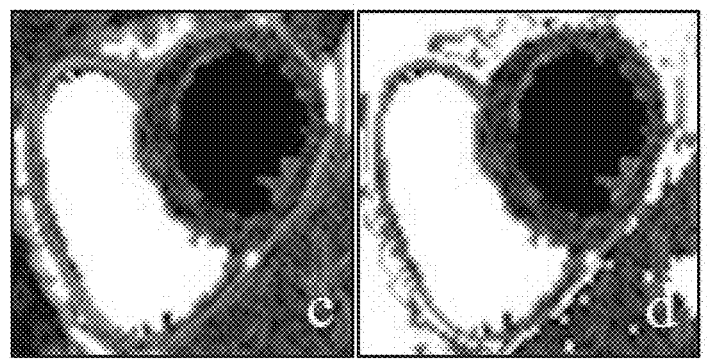
Figure 21:
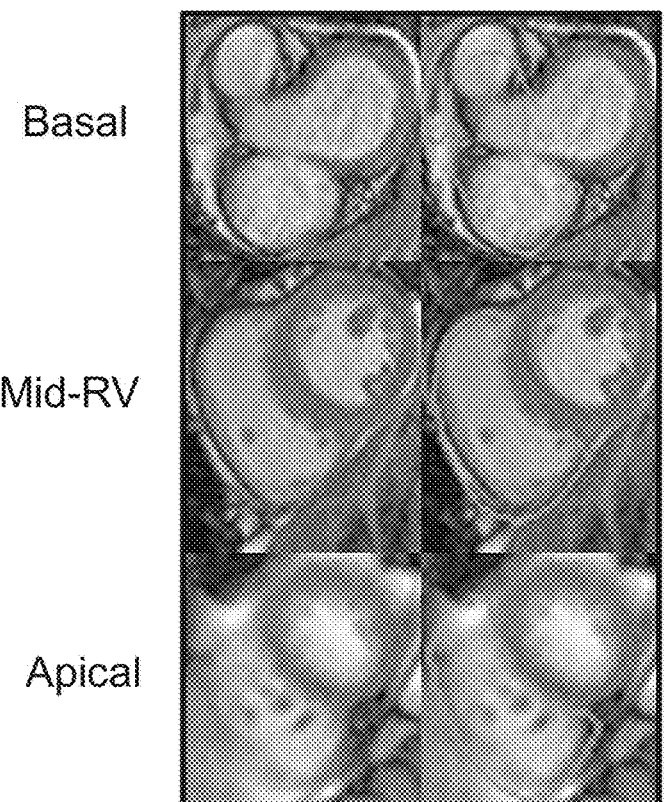
FIG. 21 shows a rough segmentation for basal, mid-RV and apical slices an embodiment of the present invention.

FIG. 20 shows a change of cost function for an embodiment of the present invention. FIG. 21 shows a rough segmentation for basal, mid-RV and apical slices an embodiment of the present invention.

The 4D segmentation of the epicardial border of the SAX RV is done in the following order: first segment the SAX RV in the representative slice at the ED frame. This generates an RV model which may be used for propagating the segmentation of the RV at the ED frame throughout the different slices (i.e., spatial propagation). Once every slice has a model, the algorithm propagates the RV model for each slice throughout the cardiac cycle (i.e., temporal propagation).

By looking at the segmentation of the epicardial border of the SAX RV more generally, it can be decomposed in the following steps: (1) reduce the ROI, (2) find rough segmentation (3) identify origin candidates, (4) update gradient image, (5) segment the RV using PDP, (6) join the segmentation masks that come from the different origin candidates and if necessary, (7) refine results. The endocardial border of the RV SAX is the convex hull of the BP regions that reside inside the epicardial border of the RV SAX.

For the above-identified ROI for each slice, the ROI includes the LV and the RV. For the segmentation of the RV, the algorithm of the present invention further reduces the ROI. This is done by removing any region that is right lateral to the 4CH RV segmentation rotated into the SAX slice and by removing any region that is left lateral to the centroid of the LV. For apical slices, an embodiment of the present invention also removes any region that is anterior or posterior to the epicardial border of the LV.

When doing the temporal propagation, the ROI in a given slice can be further reduced by analyzing only the morphological dilation of the convex hull of the RV and LV epicardial border for the given slice at the ED frame.

In other embodiments, a SAX RV model is propagated to another slice or frame using an affine transformation followed by an additional rotation matrix. This propagation is used for identifying BP regions that will be used for generating origin candidates. For spatial propagation (i.e., along the slices) $V_{model}$ is the SAX RV segmentation at the representative slice at the ED frame. For temporal propagation (i.e., throughout the cardiac cycle) $V_{model}$ is the SAX RV segmentation in the slice being analyzed at the ED frame. Let's define $V_{affine}$ as the affine transformation of $V_{model}$, where the origin is the centroid of the $V_{model}$.

$$V_{affine} = M_p * V_{model} \qquad (5.7)$$

here $M_p$ is the affine transformation matrix.

$$M_p = \begin{bmatrix} s_x\cos(\alpha) & -\sin(\alpha) & 0 \\ \sin(\alpha) & s_y\cos(\alpha) & 0 \\ t_x & t_y & 1 \end{bmatrix} \qquad (5.8)$$

where, $$s_x = \frac{\max(x_{slice}) - \min(x_{slice})}{\max(x_{rep}) - \min(x_{rep})} \qquad (5.9)$$

and for the mid-RV and apical slices:

$$s_y = \frac{\max(y_{slice}) - \min(y_{slice})}{\max(y_{rep}) - \min(y_{rep})} \quad (5.10)$$

Here $(x_{slice}, y_{slice})$ and $(x_{rep}, y_{rep})$ are the coordinates of the 4CH RV rotated into the SAX view for the slice being analyzed and the representative slice respectively. For the basal slices, the present invention set $s_y=1$, because the movement of the RV in the anterior/posterior direction is restricted due to cartilages. For the mid-RV and apical slices, the translation values $[t_x, t_y]$ measure the movement needed in order for $V_{affine}$ to be adjacent to the LV epicardial border. For the basal slices, the translation values $[t_x, t_y]$ measure the movement required to move the right lateral part of the $V_{affine}$ contour to the right lateral part of the 4CH RV rotated in the SAX view. Next, $V_{affine}$ is rotated using as origin the centroid of the LV mask:

$$V_C = M_R * V_{affine} \quad (5.11)$$

where $$M_R = \begin{bmatrix} \cos(\alpha^*) & -\sin(\alpha^*) & 0 \\ \sin(\alpha^*) & \cos(\alpha^*) & 0 \\ 0 & 0 & 1 \end{bmatrix} \quad (5.12)$$

Note the rotation angles $\alpha$ and $\alpha^*$ are not defined. For the mid-RV and apical slices, the present invention sets $\alpha$ and $\alpha^*$ to the values that maximize the number of BP pixels in $V_C$. For the basal slices, the present invention sets $\alpha=0$ and only optimize $\alpha^*$. The optimization is done using exhaustive search where $-15° \leq \alpha \leq 15°$ and $-50° \leq \alpha^* \leq 0$ both with 1° increments.

The origin candidates used for SAX RV segmentation are based on the BP regions that form part of the rough SAX RV segmentation. For the representative slice, the rough SAX RV segmentation is the 4CH RV segmentation rotated into the SAX slice line.

Given the BP regions, the algorithm calculates a Euclidean distance transform, thresholds the distance transform to include only regions that are 0.4 of the maximum distance value and then performs a morphological thinning operation. The candidate origins are ordered in a descending order based on the Euclidean distance transform. Once an initial RV SAX segmentation mask is calculated, the candidate origins that overlap with the mask are eliminated. This is repeated until no origins are left.

FIG. 22 depicts finding candidate origins in a representative slice at ED frame. (a) BP regions, (b) 4CH RV rotated into the representative SAX slice (cyan line), (c) BP region associated with the RV, (d) distance transform of (c), (e) binary mask of distance transform and (f) candidate origins.

To segment an image using an PDP of the present invention, a gradient image (G), an origin $(x_0, y_0)$ and an intensity image (I) are needed. The gradient image used for the technique is $$G(x, y, z, n) = \max_{x,y} I(x, y, z, n) - I(x, y, z, n) \quad (5.13)$$

Once (5.7) is created, the algorithm takes any pixel in the gradient image that falls outside the reduced ROI and sets it to 0. Next the algorithm finds the coordinates of the low intensity regions in I(x, y, z, n) (e.g., air) and changes the values in □(x, y, z, n) to 0.

For mid-RV and apical slices, the left lateral side of the RV may be adjacent to the right lateral side of the LV epicardial border. Therefore, the present invention makes the right lateral LV epicardial border have the maximum gradient value in (5.7). A pictorial representation of the changes incurred by the gradient image in a mid-RV slice is shown in FIG. 23.

The RV is segmented using a PDP of the present invention. The angular sampling interval used for segmenting the SAX RV in the mid-RV slices is: $\Delta\theta=[3° \; 2° \; 1°]$, whereas for the basal and apical slices $\Delta\theta=3°$. For cost function (3.9), the present invention use $\alpha=0.6$ and $\beta=0.4$. A morphological filling operation is carried out to generate a mask from the contour. For each segmentation mask created, the number of candidate origins will be reduced. The algorithm will keep generating segmentation masks until all candidate origins have been eliminated, which may result in multiple segmentation masks.

To identify which masks to keep the algorithm finds the area for each mask created. It keeps the minimum number of masks that overlap with the candidate origins. For the apical and mid-RV slices, the RV mask will be all masks that meet these criteria. For the basal slices it will keep the masks with the biggest two areas.

Figure 24:
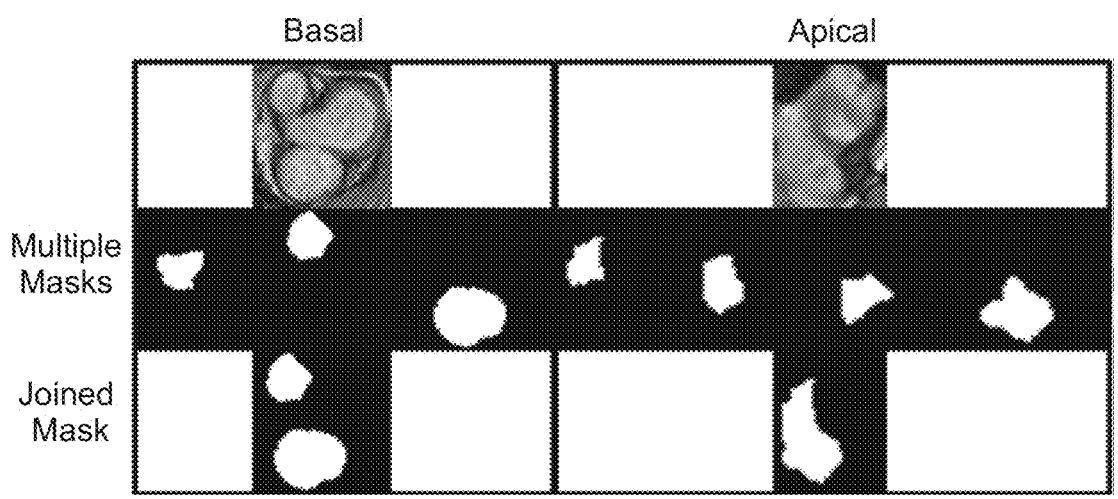
FIG. 24 depicts joining segmentation masks examples.

FIG. 24 depicts joining segmentation masks examples. For the basal slices, the technique will only pass two masks with the biggest area, while in the apical slices it will pass the number of masks that minimize the amount of overlap.

If the number of connected components for the RV segmentation of the mid-RV and apical slices is more than one, the technique will join all the connected components into a single connected component using the convex hull technique. This is followed by a smoothing operation to ensure a smooth RV contour. For the basal slices, the algorithm will go to each connected component and perform a smoothing operation to ensure a smooth RV contour, followed by a pixel-wise multiplication of the rough segmentation based on the affine transformation of the RV model. Regions of the RV segmentation that overlap with the LV segmentation will be removed.

To evaluate present invention, different patients analyzed. Images were acquired in a Siemens 1.5T Aera scanner, using a cine steady-state free-precession pulse sequence, for 4CH images (TR=2.7-2.8 ms, TE=1.16 ms, acq. matrix=156×192, FOV=26×32 cm, slice thickness=6 mm). For SAX images (TR=2.7-2.8 ms, TE=1.16 ms, acq. matrix=192×156, FOV=30×24.4 cm, slice thickness=8 mm).

Figure 25:
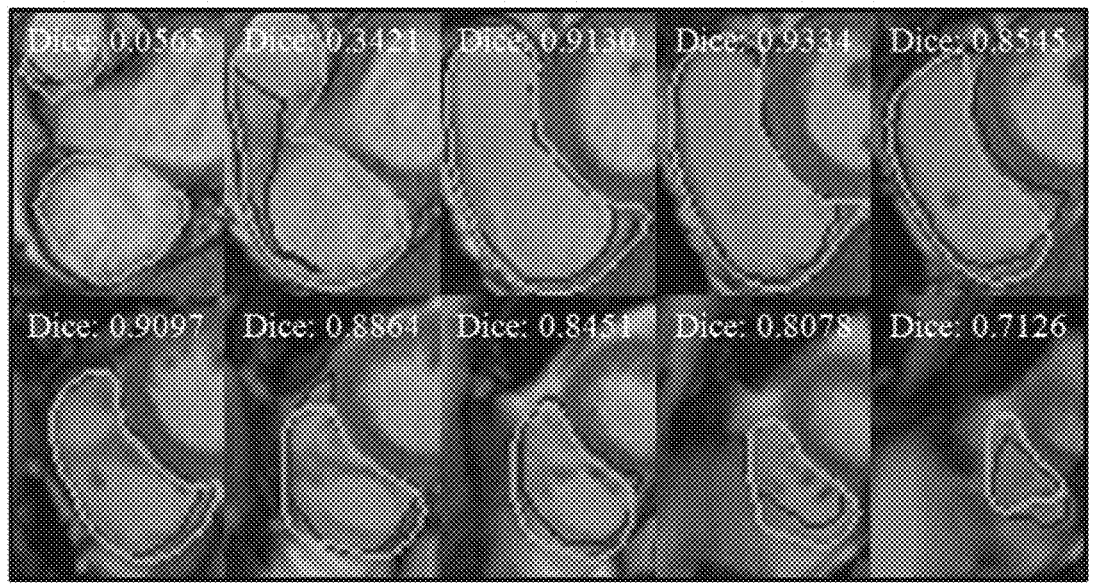
FIG. 25 shows segmentation results for a patient.
Figure 26:
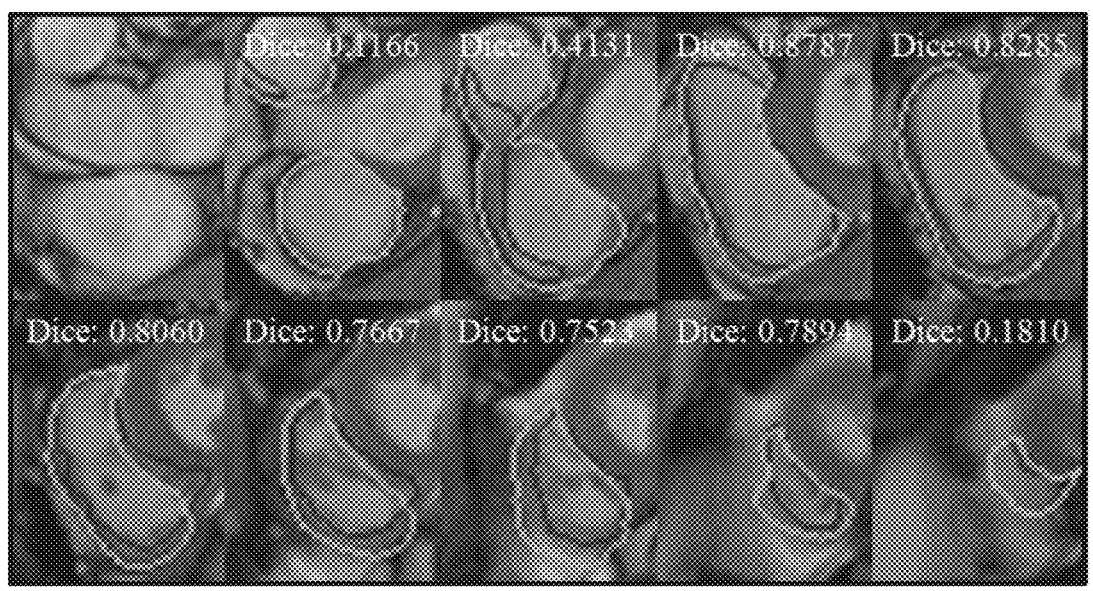
FIG. 26 provides the dice metric for one patient in the ES frame.

The performance metrics used for analysis was the Dice metric. FIG. 25 provides the dice metric for one patient in the ED frame. FIG. 26 provides the dice metric for one patient in the ES frame.

The biggest discrepancy between the semi-automated and manual traces, as measured by Dice metric, occurs in the basal and apical slices. It may also be seen that the ES frames consistently yields lower Dice values that the ED counterparts. These results are consistent with previous research on SAX RV segmentation.

Figure 27:
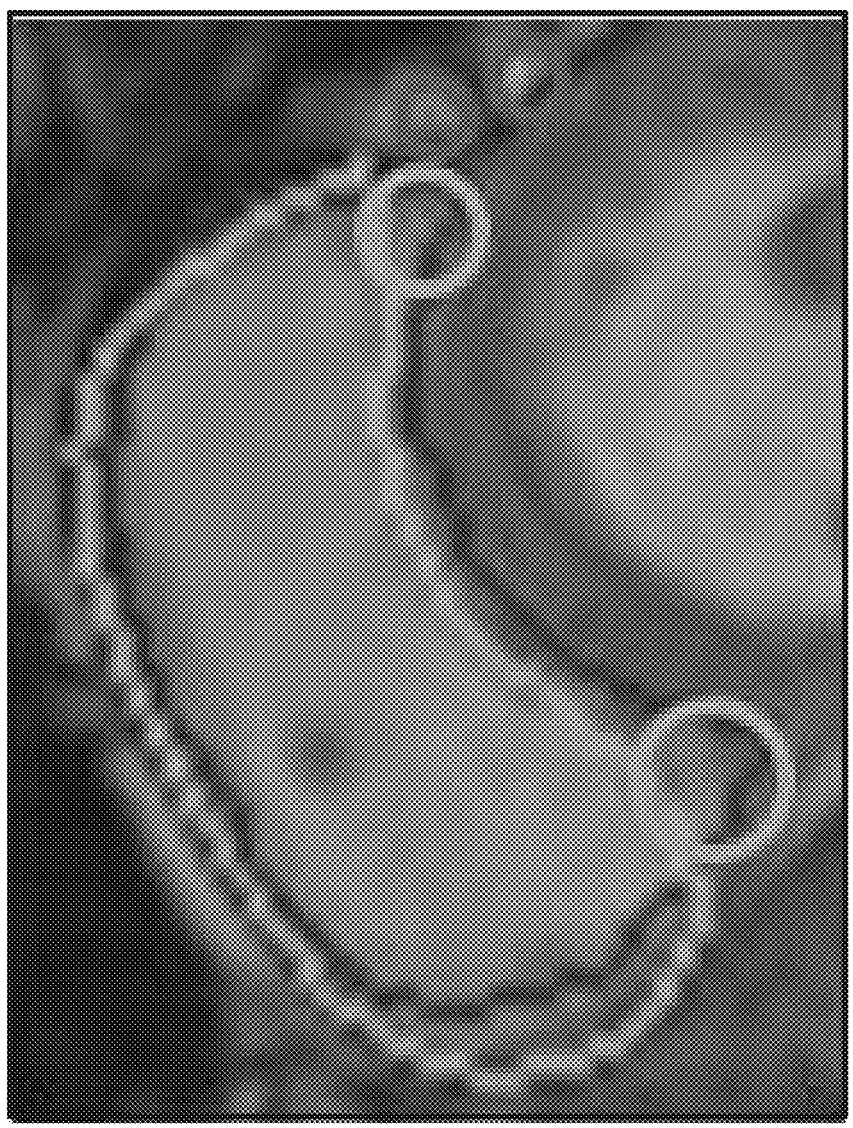
FIG. 27 shows the consequence of adding BP regions that are outside the RV epicardial border.

The biggest disagreement between the semi-automated technique and the manual traces is the basal slices. There are also small BP regions in the mid-RV slices that the semi-automated technique excludes, but the manual tracer includes. These regions could be added by modifying the candidate origins selection process to identify BP regions that are adjacent to the LV epicardial border. But adding these regions may have the unintended consequence of adding BP regions that are outside the RV epicardial border just because they are adjacent to the LV epicardial border, an example is shown FIG. 27.

Figure 28A:
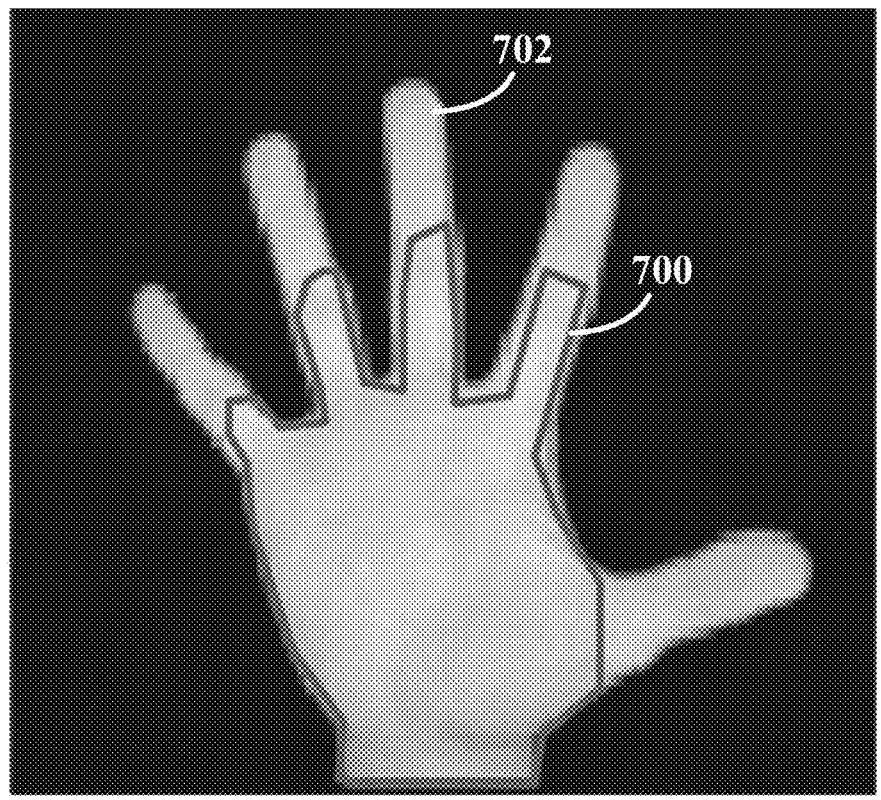
FIGS. 28A, 28B, 28C, 28D and 28E depict an exemplary implementation of a preferred embodiment of the present invention.
Figure 28B:
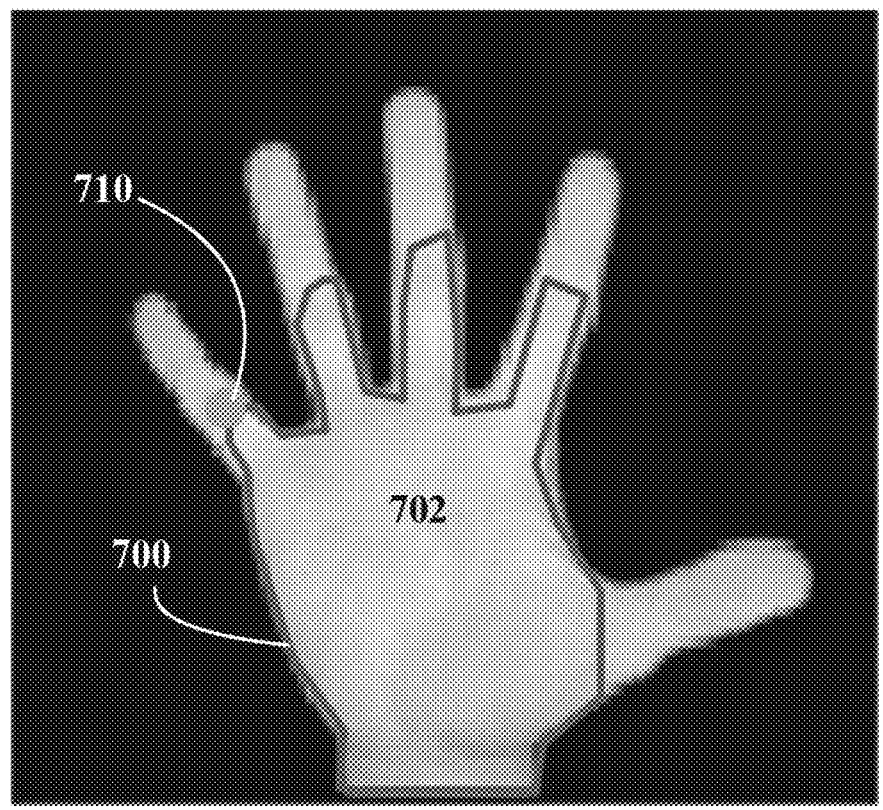
Figure 28C:
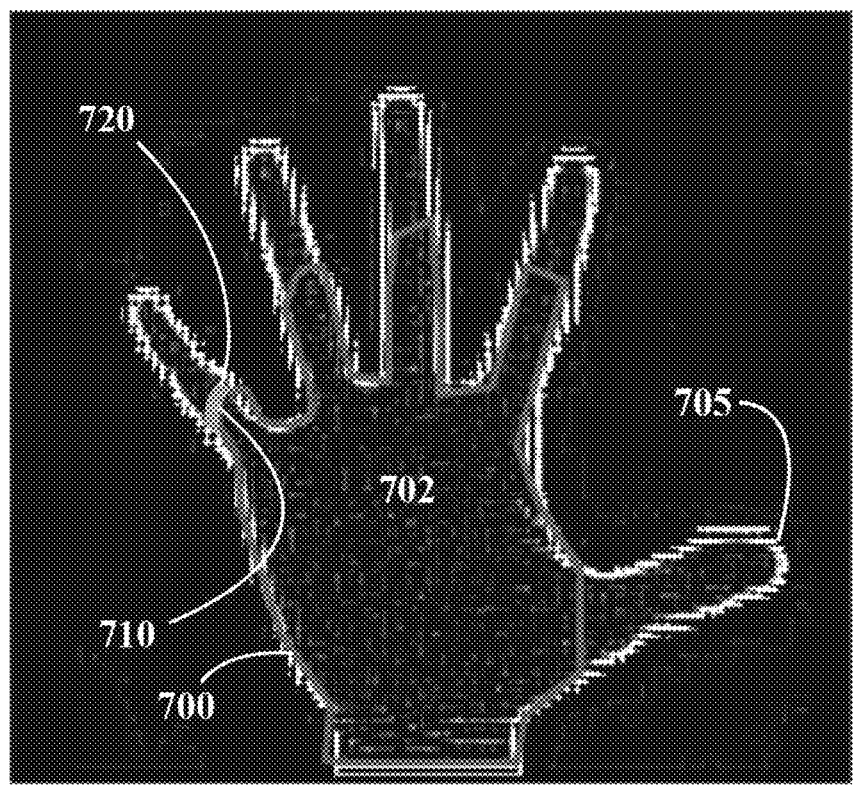

As shown in FIGS. 28A-28E, in a preferred embodiment, the present invention provides a method and system that uses polar dynamic programming to segment complex shapes in a framework. As shown in FIG. 28A, an extracted closed contour 700 of a shape 702 is established which for illustration purposes only is a hand. As shown in FIG. 28C, white pixels 705 in the image denotes high gradient regions. Extracted closed contour 700 is the sPDP segmentation where the origin is in the middle of the hand (not shown).

Dot 710 is the new origin that will be used for the region growing step. The new origin is found by selecting the middle point of a low gradient region 720 in sPDP contour 700. Low gradient region 720 is just one of the many that may be used for growing contour 700. A low gradient region 720 is defined as a sub-contours of 700 that have gradient magnitudes less than or equal to the mean gradient magnitude inside the closed-contour 700. The portion discussed is exemplary.

Figure 28D:
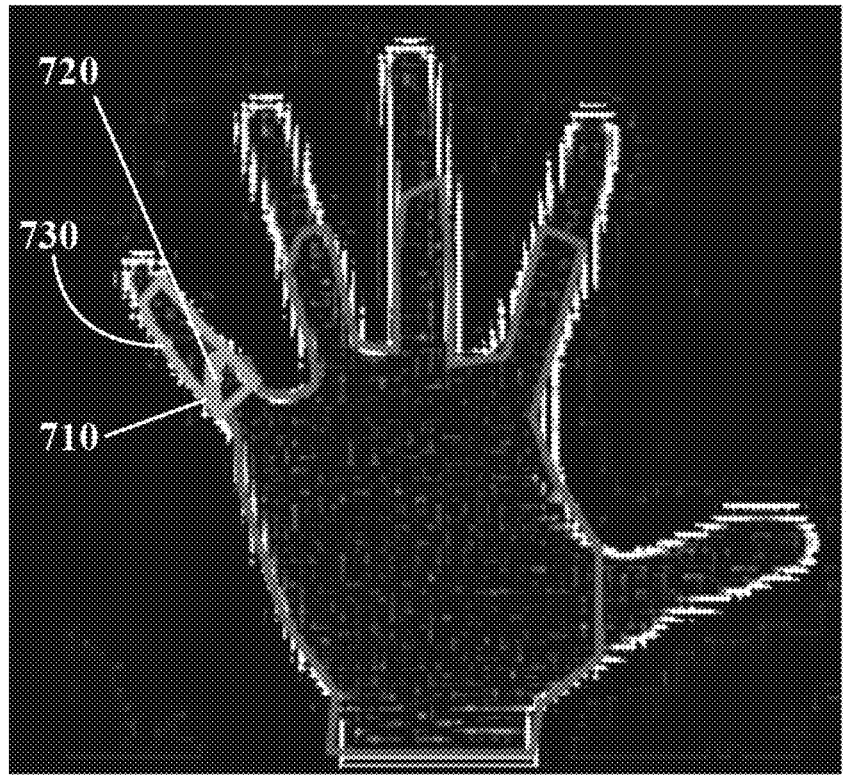
Figure 28E:
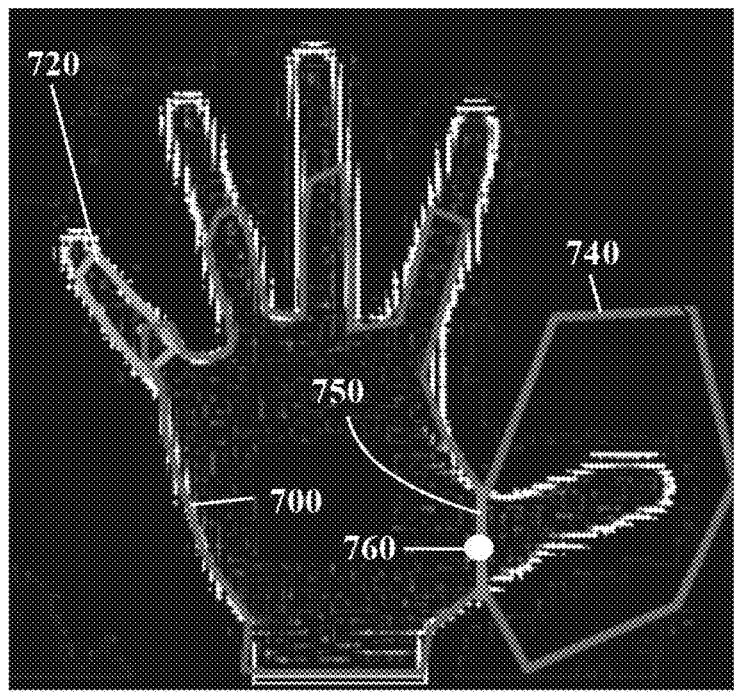

For each weak sub-contour 720, sPDP with a new origin 710 located on the weak sub-contour is run to produce a new mask 730 as shown in FIGS. 28D and 28E. Mask 730 is the output of the sPDP where the origin is dot 710. This new region will be kept (i.e., added to contour 700) because the number of low gradient pixels (i.e., outline of line 730 that is close to the pinkie) that are created by growing the new region are less than the low gradient region that was being grown.

If the total length of the weak sub-contours in the new mask 730 is less than the length of the weak sub-contour that is being grown 720, the new mask is kept and the weak sub-contour that is being grown is closed.

As shown in FIG. 28E, if the total length of the weak sub-contours in the new mask 740 is greater than the length of the weak sub-contour that is being grown 750, the new mask is not kept and the weak sub-contour that is being grown is closed. 740 is an exemplary closed contour that is the output of the sPDP where the origin is dot 760. This new region will not be kept because the number of low gradient pixels (i.e., 740) that are created by growing the new region are more than the low gradient region that was being grown (i.e., 760). The process is repeated until all the weak sub-contours have been examined and closed.

Figure 29A:
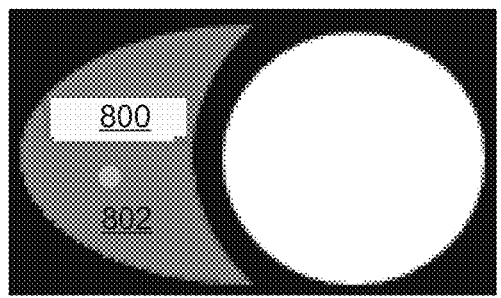
FIGS. 29A, 29B and 29C depict an exemplary implementation of a preferred embodiment of the present invention.
Figure 29B:
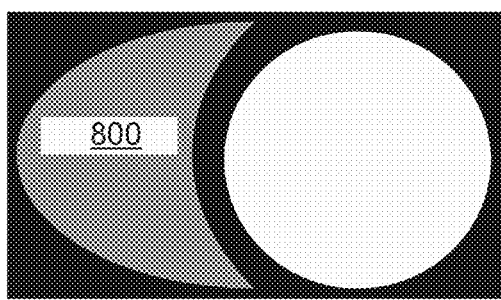
Figure 29C:
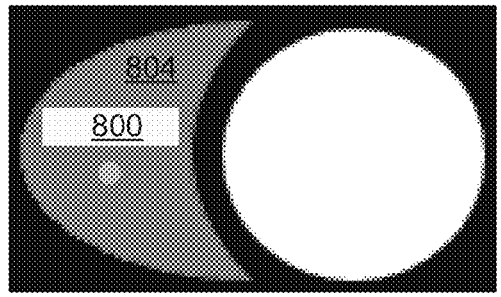

FIGS. 29A-29C show yet another preferred embodiment of the present invention. As shown in FIG. 29A, running the sPDP as described above results in every pixel in the image being analyzed. This results in region 800 inside crescent shape 802 stopping the segmentation, as shown in FIG. 29A.

To overcome this issue, the present invention modifies the sPDP to allow the delineation of an exclusion region. This allows sPDP to interpolates region 800 from nearby regions. This allows this embodiment of the present invention to go over strip 800 and segment the entire crescent 804 as shown in FIG. 29C.

An advantage of performing the above is that the right ventricle is known for having trabeculae (darker pixels) in the middle of the blood pool. The ability to find these regions that are inside the blood pool and interpolate over them by looking at nearby polar neighbors, assists in segmenting objects that have high texture.

In yet another embodiment, the present invention provides a system for segmenting a right ventricle comprising a processor and display. The processor is adapted to 1) establish an extracted closed contour of a shape; 2) grow the extracted closed contour by localizing weak sub-contours that have gradient magnitudes less than or equal to the mean gradient magnitude inside the closed-contour; 3) for each weak sub-contour, running a PDP with a new origin located on the weak sub-contour to produce a new mask; 4) if the total length of the weak sub-contours in the new mask is less than the length of the weak sub-contour that is being grown, the new mask is kept, and the weak sub-contour that is being grown is closed; 5) if the total length of the weak sub-contours in the new mask is greater than the length of the weak sub-contour that is being grown, the new mask is not kept, and the weak sub-contour that is being grown is closed; and 6) repeating steps 2-5 until all the weak sub-contours have been examined and closed. The display is adapted to show the right ventricle segmented into four chamber views.

In other embodiments, the segmentation is used to show sequential changes in the right ventricle over time. Landmarks may also be provided and used in a four chamber view and may be used to segment the right ventricle in a short axis view.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A method that uses polar dynamic programming (PDP) to segment a shape comprising the steps of:
   a. establishing an extracted closed contour of a shape;
   b. growing the extracted closed contour by localizing weak sub-contours that have gradient magnitudes less than or equal to the mean gradient magnitude inside the closed-contour;
   c. for each weak sub-contour, running a PDP with a new origin located on the weak sub-contour to produce a mask;
   d. if the total length of the weak sub-contours in the mask is less than the length of the weak sub-contour that is being grown, the mask is kept, and the weak sub-contour that is being grown is closed:
   e. if the total length of the weak sub-contours in the mask is greater than the length of the weak sub-contour that is being grown, the mask is not kept, and the weak sub-contour that is being grown is closed; and
   f. repeating steps b-e until all the weak sub-contours have been examined and closed.

2. The method of claim 1 wherein the shape of a right ventricle of a human heart is segmented.

3. The method of claim 2 wherein the right ventricle is segmented from four chamber views.

4. The method of claim 3 wherein the segmentation includes the trabeculae.

5. The method of claim 3 wherein the segmentation excludes the trabeculae.

6. The method of claim 3 wherein the segmentation includes a framework that uses landmarks selected in a four chamber view to segment the ventricle in a four chamber view.

7. The method of claim 3 wherein the segmentations from a four-chamber view are used to segment the right ventricle in short axis views.

8. The method of claim 1 wherein the PDP interpolates a region from nearby regions.

9. The method of claim 2 wherein regions that are inside the blood pool are interpolated over by analyzing nearby polar regions.

10. The method of claim 1 wherein low-gradient regions of a contour are detected, and the PDP is repeated iteratively.

11. The method of claim 1 wherein the segmentation is used to show sequential changes in the shape over time.

12. The method of claim 2 wherein the segmentation is used to show sequential changes in the right ventricle over time.

13. The method of claim 2 wherein the segmentation is used as a landmark for the apex of the heart.

14. A system for segmenting a right ventricle comprising:
a processor and a display;
said processor adapted to:
 a. establish an extracted closed contour of the right ventricle;
 b. grow the extracted closed contour by localizing weak sub-contours that have gradient magnitudes less than or equal to the mean gradient magnitude inside the closed-contour;
 c. for each weak sub-contour, running polar dynamic programming (PDP) with a new origin located on the weak sub-contour to produce a mask;
 d. if the total length of the weak sub-contours in the mask is less than the length of the weak sub-contour that is being grown, the mask is kept, and the weak sub-contour that is being grown is closed;
 e. if the total length of the weak sub-contours in the mask is greater than the length of the weak sub-contour that is being grown, the mask is not kept, and the weak sub-contour that is being grown is closed;
 f. repeating steps b-e until all the weak sub-contours have been examined and closed; and
said display adapted to show the right ventricle segmented into a four chamber view.

15. The system of claim 14 wherein the segmentation is used to show sequential changes in the right ventricle over time.

16. The system of claim 14 wherein landmarks are selected in a four chamber view and are used to segment the right ventricle in short axis views.

17. The system of claim 14 wherein the PDP interpolates a region from nearby regions.

18. The system of claim 14 wherein regions that are inside a blood pool are interpolated over by analyzing nearby polar regions.

* * * * *